United States Patent
Beard et al.

(10) Patent No.: US 6,787,033 B2
(45) Date of Patent: Sep. 7, 2004

(54) APPARATUS FOR FILTERING IMPURITIES OUT OF FLUID

(75) Inventors: John H. Beard, Kearney, NE (US); Michael J. Rodebush, Minden, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 10/235,875

(22) Filed: Sep. 4, 2002

(65) Prior Publication Data

US 2003/0019807 A1 Jan. 30, 2003

Related U.S. Application Data

(63) Continuation of application No. 09/487,126, filed on Jan. 19, 2000, now Pat. No. 6,478,958.

(51) Int. Cl.[7] .............................................. B01D 35/26
(52) U.S. Cl. ................. 210/323.2; 210/342; 210/416.5; 210/440; 210/DIG. 13
(58) Field of Search ................................ 210/315, 338, 210/342, 416.1, 416.5, 440, 458, 323.1, 323.2, DIG. 13

(56) References Cited

U.S. PATENT DOCUMENTS

| | | | |
|---|---|---|---|
| 2,843,268 A | 7/1958 | Kennedy | |
| 4,324,660 A | 4/1982 | Peyton et al. | |
| 4,655,914 A | 4/1987 | Wada | |
| 4,802,979 A | 2/1989 | Medley, III et al. | |
| 4,832,836 A | 5/1989 | Selsdon | |
| 4,872,976 A | 10/1989 | Cudaback | |
| 5,069,799 A | 12/1991 | Brownawell et al. | |
| 5,078,877 A | 1/1992 | Cudaback | |
| 5,180,490 A | 1/1993 | Eihusen et al. | |
| 5,342,511 A | 8/1994 | Brown et al. | |
| 5,447,627 A | 9/1995 | Loafman et al. | |
| 5,459,074 A | 10/1995 | Muoni | |
| 5,490,930 A | 2/1996 | Krull | |
| 5,525,226 A | 6/1996 | Brown et al. | |
| 5,562,746 A | 10/1996 | Raether | |
| 5,695,637 A | 12/1997 | Jiang et al. | |
| 5,702,602 A | 12/1997 | Brown et al. | |
| 5,738,785 A | 4/1998 | Brown et al. | |
| 5,904,357 A | 5/1999 | Demirdogen et al. | |
| 5,906,736 A | 5/1999 | Bounnakhom et al. | |
| 5,996,810 A | 12/1999 | Bounnakhom et al. | |
| 6,045,693 A | 4/2000 | Miller et al. | |
| 6,068,762 A | 5/2000 | Stone et al. | |
| 6,478,958 B1 * | 11/2002 | Beard et al. | ............. 210/323.2 |

FOREIGN PATENT DOCUMENTS

EP          287527 A      10/1988

OTHER PUBLICATIONS

European Patent Office Search Report; Application No. 00204283.6–2113/; date of search: Oct. 22, 2001.

* cited by examiner

Primary Examiner—Matthew O. Savage
(74) Attorney, Agent, or Firm—Leydig, Voit & Mayer, Ltd.

(57) ABSTRACT

Impurities contained in a fluid are removed by a filter having a housing containing a full flow filter, a bypass filter, and a conduit. The conduit includes a pressure reduction section. The full flow filter, bypass filter, and conduit are positioned such that the bypass filter is downstream of the full flow filter, and the pressure reduction section creates a pressure differential across the bypass filter that draws a predetermined portion of the fluid through the bypass filter. All of the fluid passes through the full flow filter. The predetermined portion of the fluid that passes through full flow filter is also filtered a second time by being drawn through the bypass filter.

23 Claims, 21 Drawing Sheets

FIG. 14a
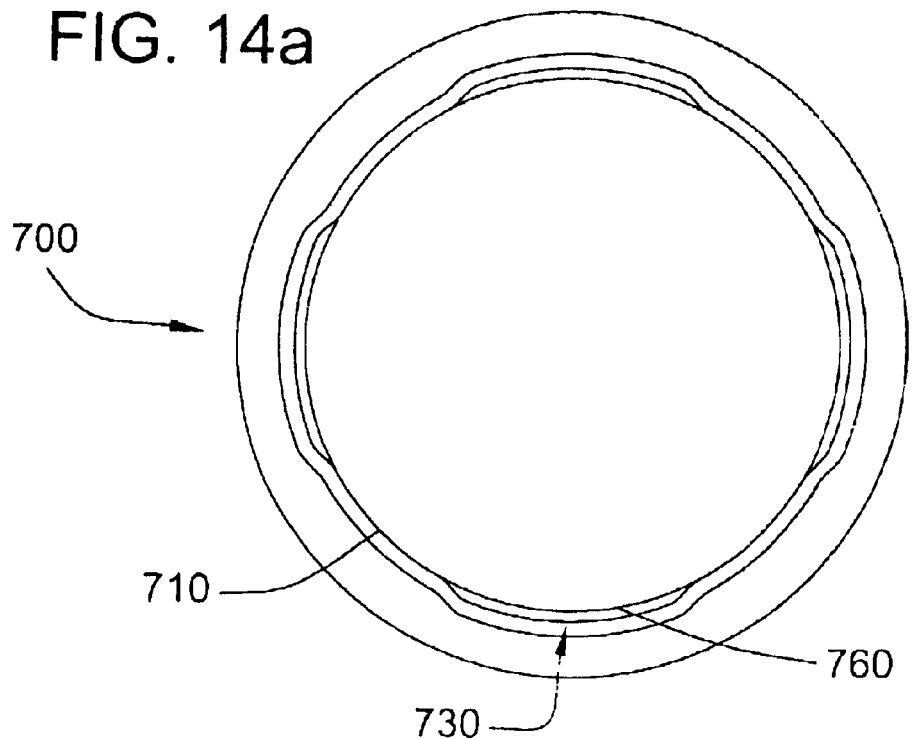
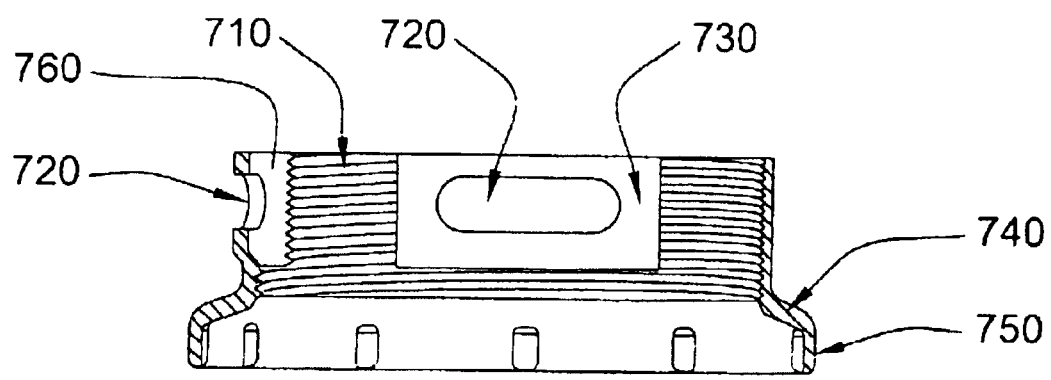
FIG. 14b

APPARATUS FOR FILTERING IMPURITIES OUT OF FLUID

CROSS-REFERENCE TO RELATED PATENT APPLICATIONS

This patent application is a continuation of U.S. patent application Ser. No. 09/487,126, filed Jan. 19, 2000, now U.S. Pat. No. 6,478,958.

FIELD OF THE INVENTION

The present invention relates to a method and apparatus for filtering impurities out of a fluid, and more particularly to a method and an apparatus for filtering impurities out of lubrication oil for use in an internal combustion engine.

BACKGROUND OF THE INVENTION

In various kinds of apparatuses utilizing fluids (for example lubrication oil), fine particulate impurities may find their way into the fluid. If such impurities are not removed, the apparatus, such as an engine, may be damaged. To avoid such catastrophic failures, various kinds of filtering systems have been proposed.

In the most usual filtering systems, there is provided a filtering circulation system separately from a main circulation system and a filter having a filtering element of relatively high density is arranged in the filtering circulation system. The circulating fluid is pumped through the filter to remove impurities contained in the fluid.

Another known technique bypasses the fluid from the main circulation system through a valve for regulating the fluid's flow rate and forces the fluid to pass through a filter of high density. The filtered fluid is returned then for re-use.

A filter is also commonly inserted into the main circulation system. In such a system, since the filter may provide a very high resistance against the flow of the fluid, a high pressure is generated in the system and thus piping and filter must have a high mechanical strength. Therefore, main circulation system filters generally have a low density. This low density results in an inability to remove fine impurities effectively. Worse, these unremoved fine particles affect the system to the greatest extent.

To avoid some of these drawbacks, filters have been provided which have a large area so as to decrease the apparent resistance of the filter and to provide a fine filter in a by-path circuit. However it is necessary to flow the fluid forcedly through the by-path circuit, because the by-path circuit has a great resistance. Therefore, a separate pump must be provided to move the fluid through the bypass circuit.

One well-known type of apparatus utilizing fluids is the internal combustion engine. Internal combustion engines generally employ two types of filtration to clean the lubricating oil. These two types of filtration are commonly referred to as full flow filtration and bypass filtration. Traditionally, full flow filtering elements receive and filter (relatively coarsely) over 75% of the regulated oil pump output in such a system prior to supply the oil to the engine components. Where a bypass filter is provided, the bypass filter typically receives only 5–10% of the pump output. The bypass filter is generally effective to "superclean" the oil. Most modern engines (gasoline and diesel) employ full flow filters. Heavy-duty engines (particularly diesel engines) are often equipped with bypass filters in addition to full flow filters. Historically, engines achieve combined full flow and bypass filtration by one of three methods.

The first method of creating combined full flow and bypass filtration is to place the full flow and bypass filters in separate containers and provide separate, individual flow circuits with a positive means of forcing flow through the bypass filter. The second method of achieving combined full flow and bypass filtration is to place the full flow and bypass filters in the same container with separate, individual flow circuits and with a positive means of forcing flow through the bypass filter. The requirement of both the first and second methods to possess more than one flow circuit increases both the internal and external plumbing of such systems, and therefore also increases cost of such systems.

The third method involves placing the full flow filter and the bypass filter in the same, single container but with a single flow circuit and without any positive means of forcing flow though the bypass filter. Such systems reduce the plumbing and expense associated with the first and second systems.

Systems based on the third method are known in the art. One problem associated with these systems is that they are able to create only parallel flow between the flow filter and bypass filter. In such parallel systems, flow passes either through the full flow filter or the bypass filter, but not all of the fluid passes through the full flow filter before exiting the system or passing through the bypass filter. To resolve this problem, some systems have been designed that incorporate a full flow filter that filters all fluid entering the filtering apparatus before the fluid either directly exits the apparatus through an outlet, or passes through a bypass filter and exits through a separate outlet. Examples of such systems are described in U.S. Pat. Nos. 5,078,877 and 5,342,511.

BRIEF SUMMARY OF THE INVENTION

One well-known type of apparatus utilizing fluids is the internal combustion engine. Internal combustion engines generally employ two types of filtration to clean the lubricating oil. These two types of filtration are commonly referred to as full flow filtration and bypass filtration. Traditionally, full flow filtering elements receive and filter (relatively coarsely) over 75% of the regulated oil pump output in such a system prior to supply the oil to the engine components. Where a bypass filter is provided, the bypass filter typically receives only 5–10% of the pump output. The bypass filter is generally effective to "superclean" the oil. Most modern engines (gasoline and diesel) employ full flow filters. Heavy-duty engines (particularly diesel engines) are often equipped with bypass filters in addition to full flow filters. Historically, engines achieve combined full flow and bypass filtration by one of three methods.

The invention further provides embodiments wherein the pressure reduction section includes either a thin-plate orifice, a long radius nozzle, a Dall nozzle, or, preferably, a venturi. In embodimetns where the conduit is a venturi, the venturi desirably has a throat having an internal diameter of about 0.95 inches. In more specific embodiments the ivnention provides at least one passageway that extends through the wall of the pressure reduction section of the conduit. More particularly, the invention provides a conduit including two passageways, each having a diameter of between about 0.17 to about 0.18 inches in diameter.

In other specific embodiments the invention provides a conduit wherein the inside diameter of the upstream end and downstream end of the conduit is between about 0.7 to about 1.2 inches, in further particular embodiments the inside diameter of the downstream end and upstream end of the conduit is about 1.125 inches.

Another embodiment of the invention provides a filter apparatus, for use in removing impurities contained in a fluid by filtration. The filter apparatus includes, including, in concentric relationship, a housing; a full flow filter; a full flow filter support; a full flow annulus; a bypass filter; a bypass filter support; a bypass annulus; and a conduit, which includes a pressure reduction section in the form of a venturi, the conduit including at least one passageway through a wall of the conduit at the venturi. In such embodiments, the filter apparatus is arranged such that the fluid to be filtered, by the filter apparatus, flows into the housing, through the full flow filter, and into the full flow annulus, such that a predetermined portion of the fluid is drawn through the bypass filter and the remainder of the fluid is drawn into the upstream end of the conduit. The fluid drawn through the bypass filter flows into the bypass annulus, and then through the at least one passageway in the venturi, and into the bypass conduit, and the fluid passing from the full flow annulus directly into the conduit flows through the venturi of the conduit causing a pressure differential across the bypass filter resulting in a predetermined amount of fluid passing through the bypass filter.

The invention further provides such apparatuses wherein the apparatus further includes a top end cap that engages the top end of the bypass filter. In more particular embodiments the top end cap includes a top end cap sealing member which has an o-ring groove, and an o-ring seal which is sealingly engaged in the o-ring groove.

In other alternative embodiments, the apparatus further includes a top end plate, which engages the top end of the full flow filter. In particular variations of the apparatus, the top end plate includes a d-ring sealing member that is capable of sealingly engaging a d-ring seal. Alternatively, the apparatus can further include a grommet seal and base plate, and the top end cap includes an inner lip that engages a grommet seal and leg extensions. The leg extensions support the base plate thereby forming flow passages between the leg extensions and the base plate. Another alternative embodiment includes a second seal, which engages the grommet seal and the base plate.

The present invention further provides a base plate that is suitable for use in a filter apparatus which includes a threaded passage, and one or more inlet ports that pass through a wall of the threaded passage. The invention further provides a similar base plate which includes one or more slotted regions, wherein the inlet ports are positioned within the slotted regions, and the slotted regions are positioned within the threaded region.

In yet another embodiment of the invention, a filter apparatus for use in removing impurities contained in a fluid includes a housing, and a full flow filter contained in said housing and arranged such that the entirety of the fluid to be filtered by said filter apparatus passes through said full flow filter. The filter apparatus further includes a base plate, which includes a threaded passage and one or more inlet ports, wherein the inlet ports pass through a wall of the threaded passage. In this embodiment, the base plate is positioned with respect to the housing and the full flow filter, such that inlet flow passes through the inlet ports and through the full flow filter.

Further provided is a conduit, for use in a filter, which includes a first upstream conduit section comprising a bottom end cap, a second conduit section comprising a pressure reduction section, and a third downstream conduit section comprising a top end cap. In such embodiments, the first upstream conduit section is sealingly engaged to the second conduit section, and the second conduit section is sealingly engaged to the third downstream conduit section, such that fluid entering the first upstream conduit section passes through the second conduit section and the third downstream conduit section.

A more particular embodiment of this three-piece conduit includes a fourth section comprising a horn section wherein the horn section is downstream of the third downstream conduit section. Also provided are embodiments where the conduit includes one or more support legs connected to the upstream end of the first upstream conduit section, which form flow passageways. In more specific embodiments, the bottom end cap includes a first u-shaped channel and the top end cap includes a second u-shaped channel. In embodiments where a bypass filter is provided, the bypass filter can be sealingly engaged between the u-shaped channels.

The present invention also provides a method of removing impurities contained in a fluid, by filtration. The method is performed by introducing a fluid to a filtering apparatus comprising a full flow filter and a bypass filter; filtering 100% of the fluid with the full flow filter; and creating a pressure differential across the bypass filter, whereby a predetermined portion of the fluid filtered by the full flow filter is drawn through the bypass filter to thereby filter the predetermined portion of the fluid a second time. In more specific embodiments, the pressure differential results from a predetermined portion of the fluid passing through the full flow filter and subsequently passing through a conduit including a pressure reduction section, as discussed above.

Further provided is an assembly for sealing the housing of a filtering apparatus, which includes a top end plate having a center passageway, a first seal, the first seal which includes an inner lip and a body portion, a seaming lid, the seaming lid comprising an outer lip and an inner groove, and a second seal. The inner lip sealingly engages the center passageway, the base plate is seated on the body portion of the first seal, the seaming lid sealingly engages the base plate, and the second seal is sealingly engaged in the inner groove, thereby completing the assembly.

BRIEF DESCRIPTION OF THE DRAWINGS

FIG. 7b is an exterior view of the grommet-type seal incorporated in the alternate embodiment of the invention shown in FIG. 7a;

FIG. 12b is a cross sectional view of the base plate shown in FIG. 12a;

FIG. 14a is a bottom view of a second alternate base plate of the present invention;

FIG. 14b is a cross sectional view of the base plate shown in FIG. 14a;

DETAILED DESCRIPTION OF THE INVENTION

For purposes of communicating an understanding of the invention, reference will now be made to the apparatus as shown in the figures, and specific language will be used to describe the same. It will nevertheless be understood that no limitation of the scope of the invention is thereby intended, and that the apparatus shown therein represents only some of the features of the claimed invention.

Figure 1:
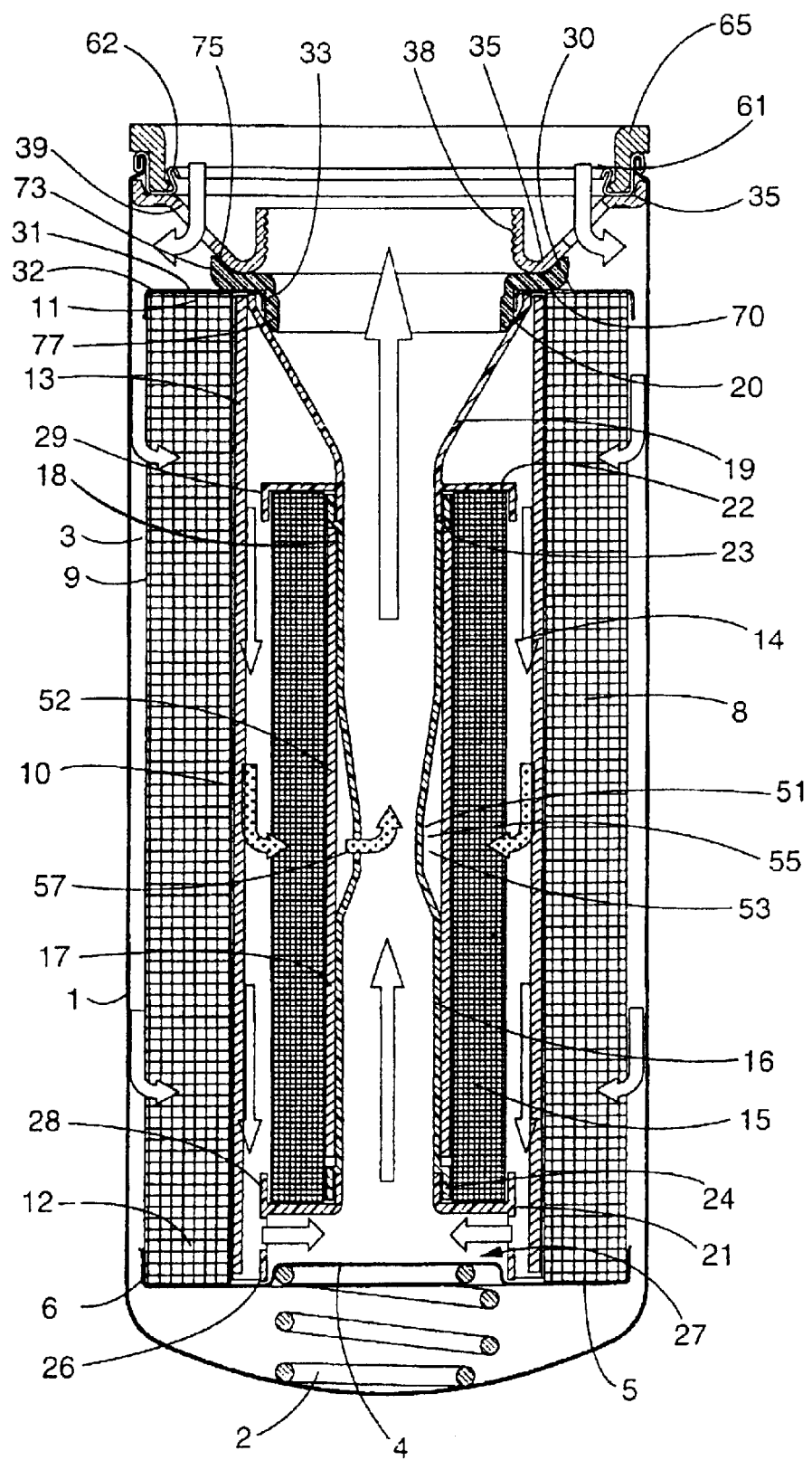
FIG. 1 is a cross sectional view showing a first embodiment of the filtering apparatus of the claimed invention.

FIG. 1 is a cross sectional view of a first embodiment of the filtering apparatus of the present invention. The filtering system may be detachably secured to a block of an internal combustion engine for the filtering of lubricant oil. The filtering apparatus comprises a housing 1, which is in the form of a cylindrical vessel having an open end and a closed end, a bottom end plate 5, a full flow filter 8, a bypass filter 15, a conduit 16 and top end plate 30. The full flow filter 8, bypass filter 15, and conduit 16 are preferably all installed in the housing 1 in concentric relationship, with the full flow filter 8 arranged within the housing 1, the bypass filter 15 within the full flow filter 8, and the conduit 16 within the bypass filter 15.

Located centrally in the interior of the filter of the present invention is the conduit 16. The conduit 16 comprises a tube with open upstream 17 and downstream 18 ends that permit fluid to flow through. The conduit 16 can be composed of any suitable form, such as stainless steel, regular steel or plastic of a suitable strength. Preferably the conduit 16 is composed of nylon plastic.

The conduit 16 includes a pressure reduction section 51. The pressure reduction section 51 can be in any suitable form, such as a Dall nozzle, a thin-plate orifice, a long radius nozzle, or a venturi (also sometimes referred to as a "venturi tube"). Preferably, the conduit 16 includes a venturi as depicted in the accompanying figures. A venturi is a device that classically incorporates a simple converging and diverging cross section and uses the basic Bernoulli principle to relate fluid velocity to pressure. Thus, to incorporate these principles, as discussed herein, the conduit 16 includes a pressure reduction section 51 that comprises a reduced diameter portion of the conduit near the longitudinal center of the conduit. The pressure reduction section 51 can be of any width (diameter) suitable to effectuate the desired amount of bypass filtration in the context of the present invention. Any suitable internal diameter for the pressure reduction section (i.e., measured at the interior of about the narrowest point therein) may be used. Preferably, the internal diameter of the pressure reduction section 51 is between about 0.5 and about 1.25 inches. More preferably, the narrowest point of the pressure reduction section (also referred to as a throat 55) has an internal diameter of between about 0.8 and about 1.0 inches. Most preferably the throat has an internal diameter of about 0.95 inches.

The change of internal diameter between the pressure reduction section 51, and the diameter of the upstream end 17 and downstream end 18 of the conduit also impacts the pressure-reducing capacity of, and flow through, the conduit 16. The internal diameter of the upstream end 17 and downstream end 18 of the conduit can be any suitable diameter in the context of the present invention. Preferably, the internal diameter of the upstream end 17 and downstream end 18 of the conduit are between about 0.7 to about 1.2 inches. More preferably, the internal diameter of the upstream and downstream ends of the conduit are between about 1.0 to about 1.15 inches. Optimally, the internal diameter of the upstream and downstream ends of the conduit is about 1.125 inches.

In real flow settings, friction and turbulence play roles in the flow speed of a liquid passing through a venturi. These factors influence a venturi's ability to create a pressure differential. To counteract the effect of such forces, the conduit transitions into and out of the pressure reduction section 51. Preferably, the diameter of the conduit 16 gradually enlarges in the transition area from the throat to the downstream end 18. The rate of enlargement of the conduit from the throat to downstream end 18 can be at any suitable rate sufficient to reduce turbulence. Preferably, the angle of enlargement on the downstream side of the throat is marked by an angle of between about 5° to about 8°. More preferably, the angle of enlargement is about 8°.

Turbulence and friction are also counteracted in part by gradually narrowing the diameter of the conduit 16 from the upstream end 17 to the pressure reduction section 51. This narrowing can be at any suitable rate. Preferably, the conduit is narrowed at an angle of about 20° to about 22° between the upstream end 17 and the pressure reduction section 51. More preferably, the narrowing is marked by an angle of about 22°.

The pressure reduction section 51 also includes one or more bypass ports 57, preferably positioned at or near the throat 55 that permit fluid to flow into the conduit. The bypass port 57 comprises an orifice transiting through the conduit. Preferably, the pressure reduction section 51 has two bypass ports 57 positioned on opposite sides of the conduit 16 to promote even flow through the entire bypass filter 15. In accordance with the present invention, and as further described herein, the bypass port 57 can be of any suitable size to permit a pre-determined portion of fluid to flow into the conduit 16, thereby causing a predetermined amount of fluid to flow across (i.e., be filtered by) the bypass filter 15 to achieve a predetermined total filtration efficiency. Preferably two bypass ports with diameters of about 0.17 to about 0.18 inches, more preferably about 0.176 inches, are included in the conduit.

Figure 2:
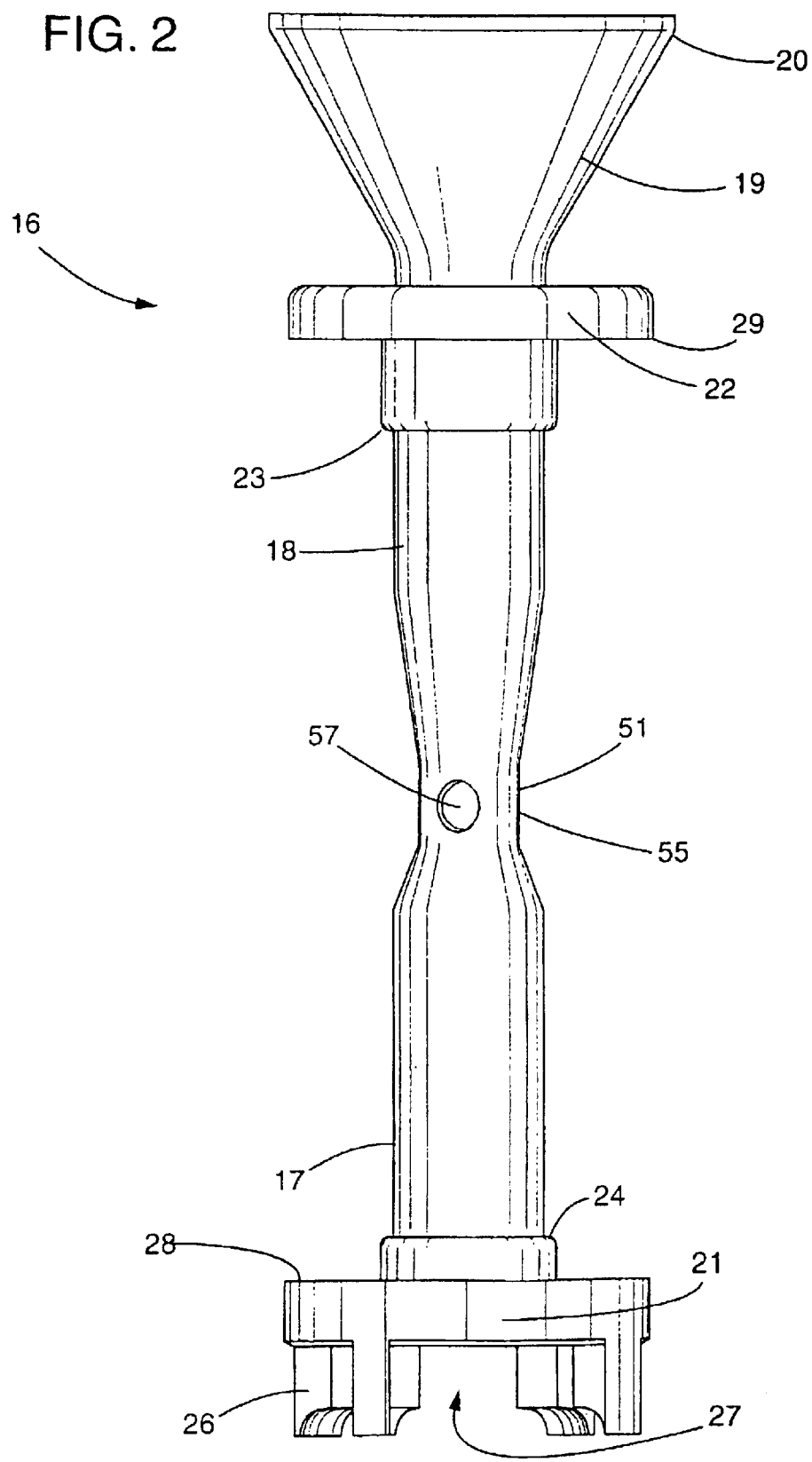
FIG. 2 is an exterior view of an embodiment of the conduit component of the present invention.
Figure 2A:
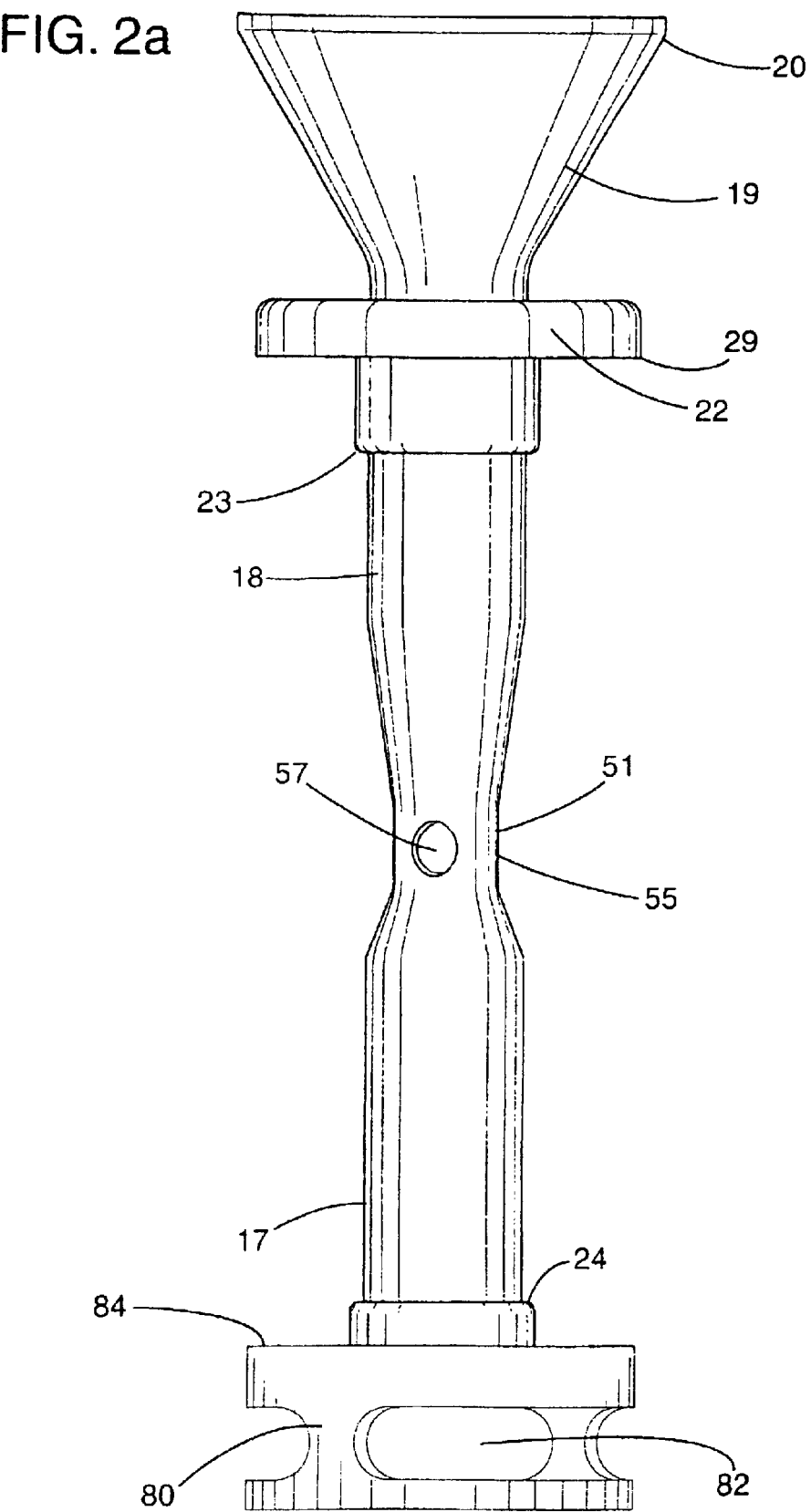
FIG. 2a is an exterior view of the embodiment of the conduit component in FIG. 2, incorporating an alternate bottom end cap.

As seen in FIG. 2, at the upstream end 17, the conduit includes a first u-shaped channel 21 into which the bottom end of the bypass filter 15 can be sealingly engaged. The upstream end 17 of the conduit further includes support legs 26 which support the conduit 16 and the bypass filter 15. The support legs 26 also create flow passages 27 through which fluid filtered by the full flow filter 8 may pass. Alternatively, as seen in FIG. 2a, the conduit can include a circular-shaped lower section 80. Rather than support legs 26, the circular lower section includes inner flow passages 82 transiting through its walls, through which fluid filtered by full flow filter 8 flows into the conduit 16.

The downstream end 18 of the conduit 16 preferably transitions through a straight conduit section into a horn section 19 which is sealingly engaged by a top end plate 30 described herein. In the first embodiment of the claimed invention, shown in FIG. 1, the radius of the horn section 19 is preferably greater than the other sections of the conduit to ease flow out of the conduit, and reduce frictional and turbulent forces as described herein, and terminates in a short straight section 20 to assist in sealingly engaging the top end plate 30 thereto.

Immediately prior to the initiation of the increasing diameter of the conduit 16 to form the horn section 19, the conduit 16 preferably includes, preferably in an annular arrangement around the exterior of the downstream end 18 of the conduit, a second u-shaped channel 22 into which the top end of the bypass filter 15 can be sealingly engaged in a manner described herein. Both the first u-shaped channel 21 and the second u-shaped channel 22 can be formed and attached to the conduit 16, such as by soldering or welding, or can be molded in unitary construction with the conduit 16, for example where the conduit 16 is formed from a moldable material, such as a plastic.

Figure 3:
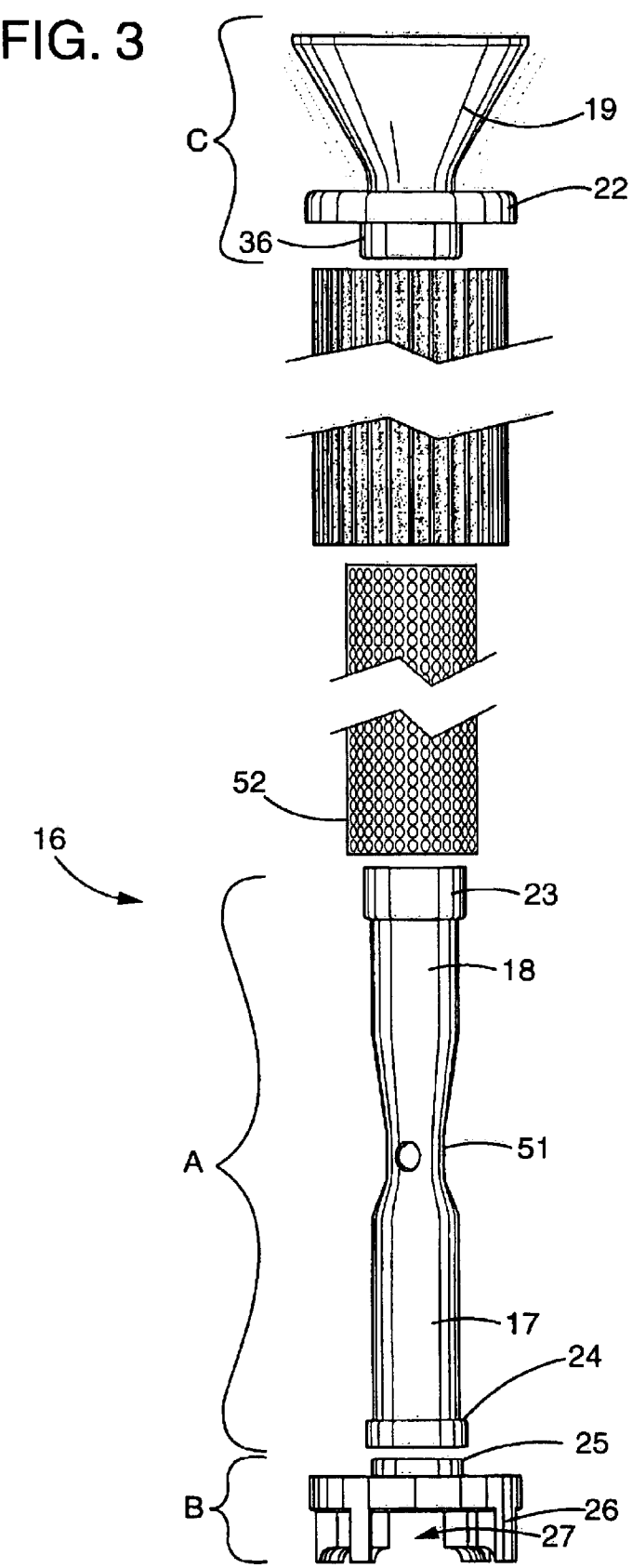
FIG. 3 is an exploded view of an embodiment of a conduit component of the present invention that is assembled from sub-components.

More preferably, the conduit 16 is formed from at least three sections. In such an embodiment of the present invention, the first section A, of the three-section conduit component, as shown in FIG. 3, includes the upstream portion 17 of the conduit, the pressure reduction section 51 and the downstream portion 18 (with the exclusion of the horn section 19). The second section B may be termed a conduit bottom end cap and includes a first u-shaped channel 21 and the support legs 26 including the flow passages 27 through which fluid filtered only by the full flow filter 8 passes. Alternatively, as seen in FIG. 2a, the bottom end cap of the conduit can take the form of a circular-shaped lower section 80. Rather than support legs 26, the circular lower section includes inner flow passages 82 transiting through its walls, through which fluid is filtered by full flow filter 8 flows into the conduit 16. The circular-shaped lower section 80 also includes a lower u-shaped channel 84, which acts similar to the first u-shaped channel in the principle embodiment of the conduit 16. The horn section 19 and the second u-shaped channel 22 are preferably formed as a third section C, which may be termed a conduit top end cap, and which can be sealingly engaged with the first section A. Preferably, a sealant such as Plastisol is applied to the three sections, at points where they engage each other.

The conduit 16, can take any suitable form. Preferably, where a venturi is incorporated into the conduit 16, the venturi is of a form that causes the fluid flow through the pressure reduction section 51 to be substantially linear fluid flow. One preferable form of venturi is one similar to the type of venturi used in venturi gauges that are known in the art. Filters incorporating such conduits demonstrate better flow qualities through the conduit as flow is directed in a linear fashion rather than in multiple directions. Thus, the ability of the filter apparatus to filter more fluid rapidly, and to cause a greater amount of fluid to be drawn through the bypass filter, is increased.

Preferably, the conduit of the present invention further comprises sealing members which may be attached to or molded in a unitary construction with the conduit 16. An example of such an embodiment of the present invention is shown in FIG. 3 wherein a sealing member 23 is positioned in an annular relationship around the downstream end 18 of the conduit. The sealing member 23 has an interior which engages the first u-shaped channel 22 of the conduit and an exterior which engages the upper end of the bypass support tube 52. Likewise, a second sealing member 24, which may be similarly attached or molded, is positioned at the upstream end 17 of the conduit, and has an interior which engages the first u-shaped channel 21, and has an exterior that can engage the lower end of a bypass support tube 52. The first u-shaped channel 21 is formed between the second sealing member 24 and a first u-shaped channel outer retainer 28, which comprises a lip protruding towards the interior of the filter, and is used to sealingly engage the bypass filter 15 as described herein. The second u-shaped channel 22, is similarly formed between the sealing member 23 and a retainer 29 and also sealingly engages the bypass filter.

Preferably, encircling the conduit 16 is a bypass support tube 52, comprising a tube perforated along its length to allow fluid to readily flow through it. The bypass support tube 52 can be formed of any material suitable for maintaining a spaced relationship between the conduit 16 and the bypass filter 15. Preferably, the bypass support tube 52 is composed of steel, such as stainless steel.

The contact between the sealing member 23, second sealing member 24 and bypass support tube 52, maintains a spaced relationship between the conduit 16 and the bypass support tube 52, forming a bypass annulus 53. This spaced relationship between the bypass support tube 52 and the conduit 16 is amplified by the narrowing diameter of the conduit 16 which forms the pressure reduction section 51.

Preferably encircling the bypass support tube 52 is the bypass filter 15. The bypass filter 15 may be formed from any suitable bypass media including such media as cellulose, synthetic fiber or micro-glass. Preferably, the bypass filter 15 comprises a cellulose media. The bypass filter 15 is of a higher density than the full flow filter 8 and naturally resists passage of fluid when the fluid is offered the alternative of an open passage way, such as through the support legs 26. The bypass support tube 52 supports the bypass filter 15 and prevents pressure differential from collapsing the filter.

The lower end of the bypass support tube 52 sets in the first u-shaped channel 21, and the bypass filter 15 is sealingly engaged in the first u-shaped channel 21 between the outer retainer of the u-shaped channel 21 and the bottom end of the bypass support tube 52. Likewise, the upper end of the bypass support tube 52 rests in the second u-shaped channel 22, and the bypass filter 15 is sealingly engaged in the second u-shaped channel 22 between the outer retainer 29 of the second u-shaped channel and the top end of the bypass support tube 52. Preferably, the bypass filter 15 is secured in this position within the first 21 and second 22 u-shaped channels by applying a sealant such as glue, or a curable compound sealant such as Plastisol, to create a seal between the bypass filter 15 and u-shaped channels 21, 22.

Figure 4:
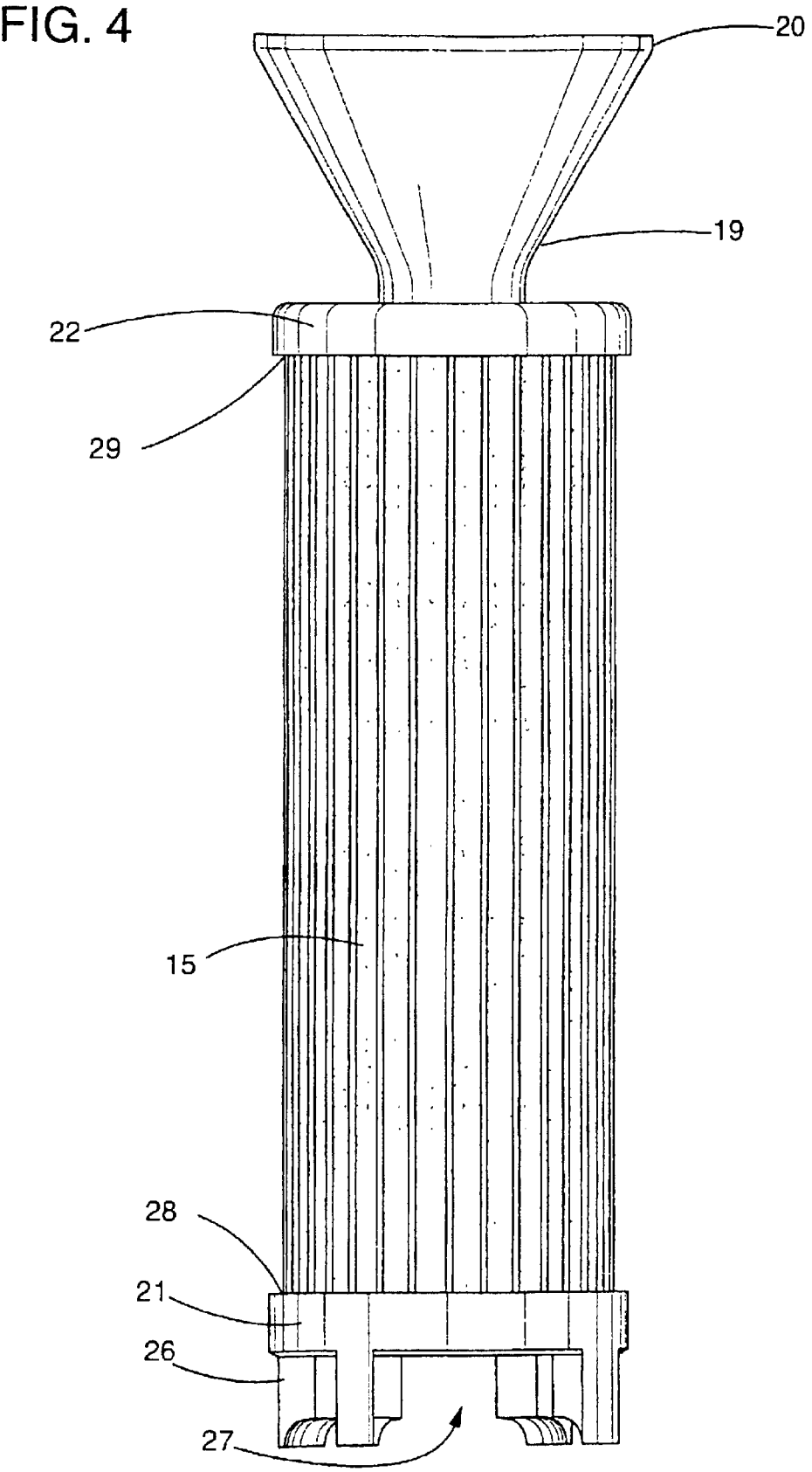
FIG. 4 is an exterior view of the assembled sub-components of FIG. 3.

As seen in FIG. 3 and FIG. 4, where the three-piece conduit embodiment is incorporated in the present invention, the first section A is seated on the second section B in a sealing relationship. The bottom ends of the bypass support tube 52 and the bypass filter 15 are then seated in the first u-shaped channel 21. Preferably, the second sealing member 24 sealingly engages a bottom end cap sealing member 25, which is attached to or integrally formed with, and protrudes into the interior of the filter from, the first u-shaped channel 21. The third conduit section C is then sealingly engaged to the first conduit section A, preferably by the sealing member 23 engaging a top end cap sealing member 36, which is attached or formed with the second u-shaped channel 22, while at the same time engaging the upper ends of the bypass support tube 52 and the bypass filter 15. The components in this type of embodiment (i.e., sections A, B and C) can be sealingly engaged in any suitable manner known in the art, such as by application of a Plastisol sealant.

Surrounding the bypass filter is the full flow annulus 14. Preferably, the full flow annulus 14 is formed by the spaced relationship between a full flow support tube 13 and the bypass filter 15. The full flow support tube 13 comprises a perforated tube that completely encircles the bypass filter 15. The full flow support tube 13 can be composed of any suitable rigid material. Preferably, the full flow support tube 13 is composed of steel. More preferably, the full flow support tube 13 is composed of steel with a tin coating.

Encircling the full flow support tube 13 is the full flow filter 8. The full flow filter 8 is composed of a material and designed so as to permit filtering of the entirety of the fluid entering the filter of the invention by the full flow filter. The full flow filter 8 may be formed from any suitable filter media for this purpose. Examples of suitable filter media for the full flow filter 8 include cellulose, synthetic fiber, or micro-glass. Preferably, the full flow filter 8 is formed from micro-glass, synthetic fiber or other synthetic media. Similar to the bypass filter 15, the full flow filter 8 is preferably of a tubular shape to permit the encompassing of the bypass filter 15 and conduit 16 by the full flow filter 8. The full flow support tube 13 supports the full flow filter 8 and prevents pressure differential from collapsing the filter.

Figure 5:
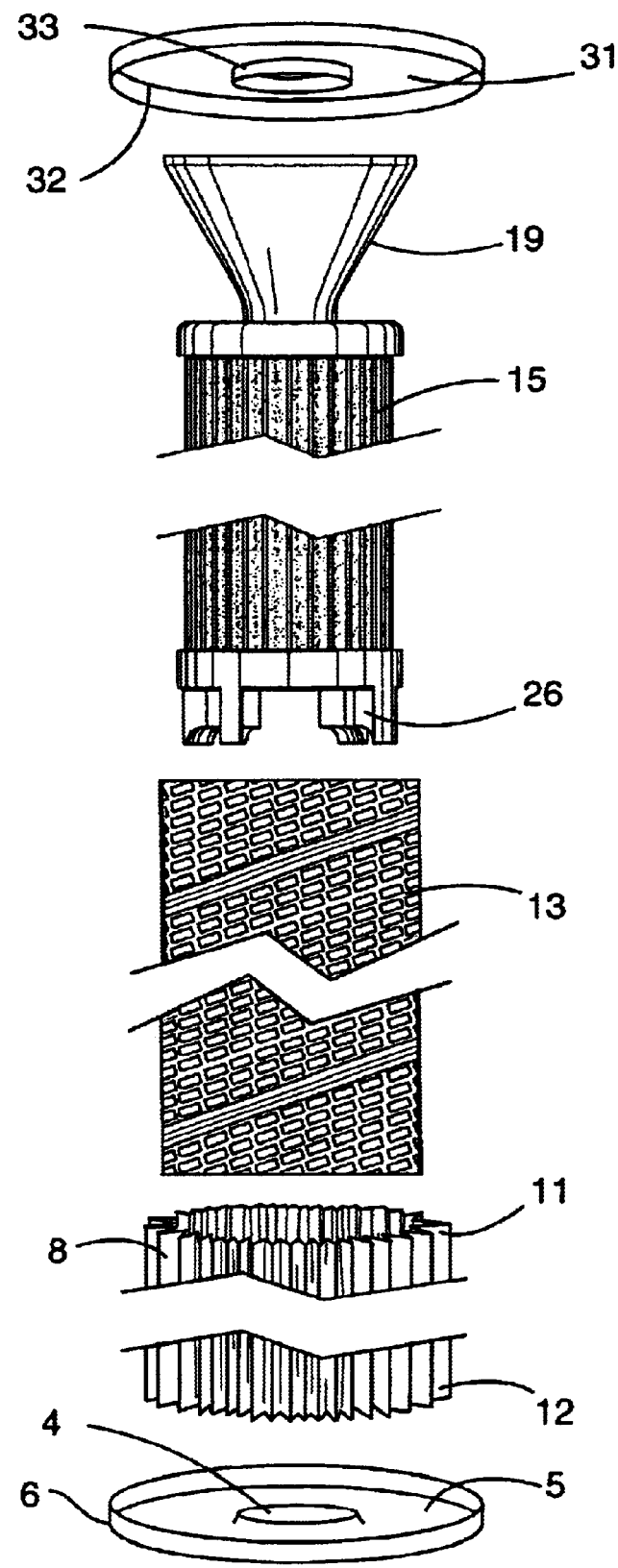
FIG. 5 is an exploded view of a portion of the interior components of the apparatus shown in FIG. 1.

As seen in FIG. 5, the bottom end of the full flow filter 12 is sealingly engaged in a u-shaped channel formed within the interior end of the bottom end plate 5. The bottom end plate 5 is in the form of a u-shaped cap into which the bottom ends of the full flow support tube 13 and the full flow filter 8 fit, and are thus maintained in a spaced concentric relationship within the housing 1. The bottom end plate 5 preferably includes a depression 4 on the exterior of the cap into which the end of a coiled spring 2 is seated. Around the opposite side of this depression 4, which forms a raised area protruding into the interior of the closed end of the housing 1, the conduit support legs 26 are engaged and maintained in a fixed spaced relationship, thereby forming the flow passages 27 into the conduit 16. As shown in FIG. 5, the u-shaped channel of the interior of the bottom end plate 5 is formed between the protruding interior of the depression 4 and an outer retainer 6 of the bottom end plate which is connected at a right angle to the depression 4, and comprises a lip encircling the perimeter of the bottom end plate and protruding into the interior of the filter apparatus.

While no seal is required between the support legs 26 and the bottom end plate 5, because of the flow passages 27, the full flow filter 8 must sealingly engage the bottom end plate 5 to prohibit fluid from bypassing the full flow filter. The sealing is preferably accomplished by a curable compound such as Plastisol, which creates a seal between the bottom end of the full flow filter 8 and the bottom end plate 5.

Positioned at the open end of the housing 1 is a top end plate 30. The top end plate 30 is in the form of a circular plate encircling an open space through which fluid exiting the conduit flows. Preferably, the top end plate 30 is formed from a single piece of material or is molded as a single integral component. The top end plate 30 can be formed of any material of suitable strength. Examples of such suitable materials include steel, aluminum or plastic.

As shown in FIG. 5, the top end plate 30 includes the end plate 31 (or body section), an outer retainer 32 connected and protruding towards the interior of the filter at a right angle to the outer perimeter edge of end plate 31, and an inner retainer 33 connected and protruding towards the interior of the filter at a right angle to the inner edge of the end plate 31.

The inner retainer 33 is seated within the interior of the top end of the horn section 19 of the conduit, thereby forming a u-shaped channel on the interior end of the top end plate 30, between the exterior of the short straight section 20 of the conduit and the interior of the outer retainer 32 of the top end plate. The top end 11 of the full flow filter is engaged in this channel. Preferably, the top end of the full flow filter 11 is secured within this u-shaped channel by the application of a Plastisol sealant applied to the top end of the full flow filter 11, the horn section 19 and the top end plate 30. In embodiments where a full flow support tube is present, the full flow support tube 13 may extend from the top end plate 30 to the bottom end plate 5 or the full flow filter may be any workable length less than the distance between the top end 30 and the bottom end plate 5 so long as adequate support is provided for the full flow filter. Through this configuration of the top end plate 30, conduit 16, and full flow filter 8, the top end plate 30 of the present invention effectively prevents fluid containing impurities entering the apparatus from mixing with the filtered fluid exiting the apparatus.

Enclosing and encircling the full flow filter 8 is the housing 1. The housing 1 can comprise any shape suitable to filter fluids in the context of the present invention. As described elsewhere herein, the housing 1 is preferably formed from a cylinder having an open end and a closed end. An inlet annulus 3 is created between the housing 1 and the exterior of the full flow filter 8. The housing 1 can be made of any suitable material depending on the intended use of the apparatus. Examples of suitable materials include steel, aluminum, or plastic. Preferably the housing is made of steel.

In assembly of the filter elements contained in the filter of the present invention, the various components are assembled in an orientation opposite to that seen in FIG. 1. Specifically, the apparatus is assembled, as described above, using the top end cap 30 as base. A spring, such as a coil spring 2, is then placed onto the top of this assembly, and the closed end of the housing 1 is then placed over the assembly and the spring 2. The spring 2 is preferably formed from steel and has a spring force of about 35 to about 50 psi. The spring 2 is compressed between the interior of the closed end of the housing 1 and the depression 4 on the exterior of the bottom end plate 5.

Figure 6:
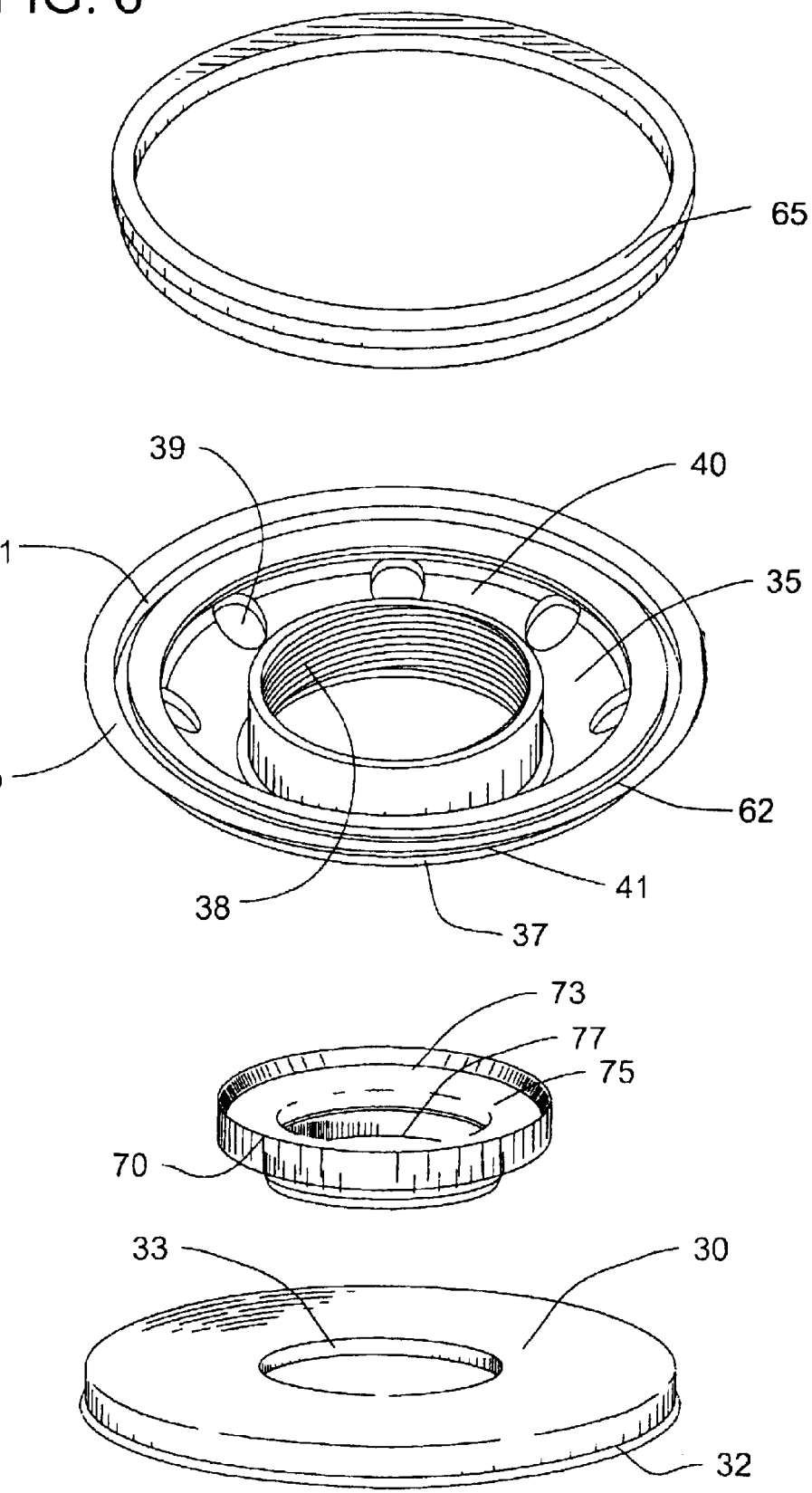
FIG. 6 is an exterior view of the first circular seal, top end plate, and connected base plate and seaming lid components of the first embodiment of the invention.

The filter of the present invention is completed using a first circular seal 70, a base plate 35, a seaming lid 60 and a second circular seal 65. As seen in FIG. 6 as well as FIG.

1, the base plate 35 is used in conjunction with the first circular seal 70, which is placed between the top end plate 30 and the base plate 35. The first circular seal 70 is preferably formed from nitrile or another suitable rubber compound. The first circular seal 70 includes an upper lip 73, a body portion 75 and a lower lip 77. The lower lip 77 engages the post from the apparatus through which the filter of the present invention is attached to the apparatus such as an engine. The post of the apparatus extends down and through the center of the lower lip 77 in sealing engagement when the filter is attached thereto.

The upper lip 73 and body portion 75 engage the base plate 35. The base plate 35 includes a conventional threaded passage 38 which engages the threads on the apparatus post (not shown). The base plate 35 also comprises a slanting first wall segment 40 which includes inlet ports 39, through which the fluid to be filtered passes, and an upturned internally threaded segment 38 which is suitable for engaging an oil inlet post (not shown). Preferably, the inlet ports 39 are arranged angularly in a circular array around the perimeter of the threaded passage 38 and are located within the slanted first wall segment 40 of the base plate.

Inlet fluid enters the inlet annulus 3 and the first circular seal 70 prevents this inlet fluid from bypassing the filters and returning directly to the engine without filtration. The base plate 35 also includes a transition section 41 that extends outward from the slanted first wall segment 40 above the inlet ports 39 at a smaller incline than the first slanted wall segment. The base plate 35 further comprises an upturned outer lip 37, which is attached to the outermost portion of the transition section 41 and is positioned adjacent the outer open end of the housing 1.

A seaming lid 60 is then attached to the base plate 35 and to the open end of the housing 1, as seen in FIG. 1 and FIG. 6. The seaming lid 60 preferably comprises a circular ring having an interior circular groove 61 that consists of a unshaped channel with its open end facing towards the open end of the housing 1, and a downward turn outer rim 62 that surrounds the exterior of the seaming lid and protrudes beyond the periphery of both the base plate 35 and the housing 1. Preferably, the seaming lid 60 is applied by placing the bottom side of the portion of the seaming lid that forms the circular groove 61 within the outer lip 37 of the base plate, and welding the bottom side of the seaming lid at the circular groove 61 to the transition section 41 of the base plate as seen in FIG. 6. Preferably, this welding of the base plate 35 and seaming lid 60 occurs before sealing the filter.

A second circular seal 65 is placed within the circular groove 61. The second circular seal 65 engages the apparatus, such as an engine, to effect a seal to prevent leakage of the outlet fluid passing from the apparatus to the filter. The second circular seal 65 may take the form of any of such well-known seals (e.g., a gasket) and preferably is smooth on the exterior surface. Preferably, the second circular seal 65 is in the form of a flat seal that includes an undercut portion that fits within the circular groove 61 which assists in holding the second circular seal 65 in place.

The seaming lid 60, preferably welded to the base plate 35 as described above, is applied to the filter of the present invention, compressing the spring 2. As seen in FIG. 1, the outer rim 62 of the seaming lid 60, which is elevated above the circular groove 61, and which extends beyond the periphery of the base plate 35 and the housing 1, forms a channel into which the periphery of the open end of the housing 1 can fit. Preferably, the housing 1 further comprises a slightly overturned outer lip (not shown) that extends beyond the periphery of the housing 1. When the elements of the filter apparatus are assembled as described above, the outer rim 62 of the seaming lid and the outer lip of the housing are subsequently turned over (crimped) thereby sealing the contents of the filter within the housing 1.

Figure 7A:
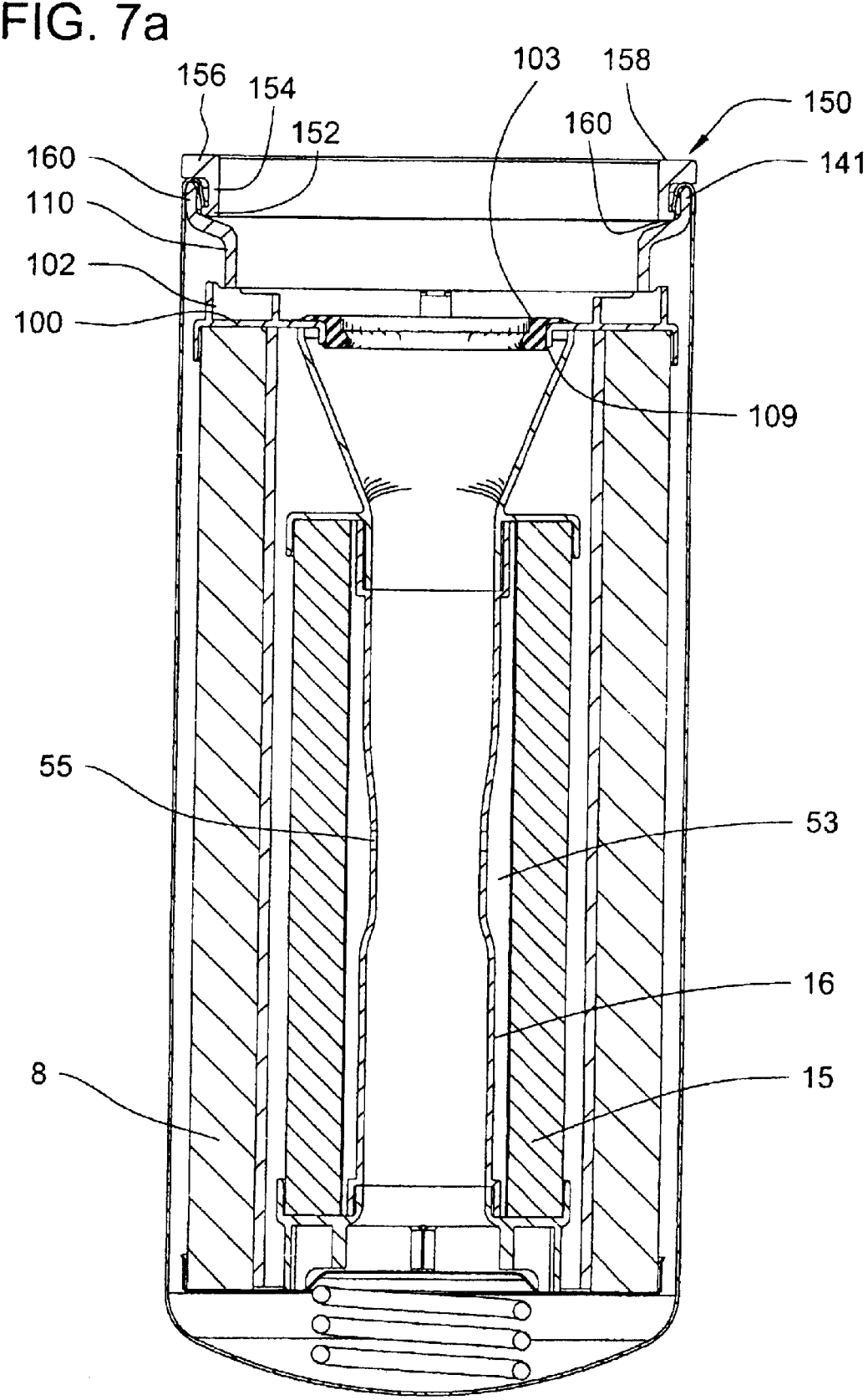
FIG. 7a is a cross sectional view of an alternate embodiment of the claimed invention incorporating a grommet type seal.
Figure 7B:
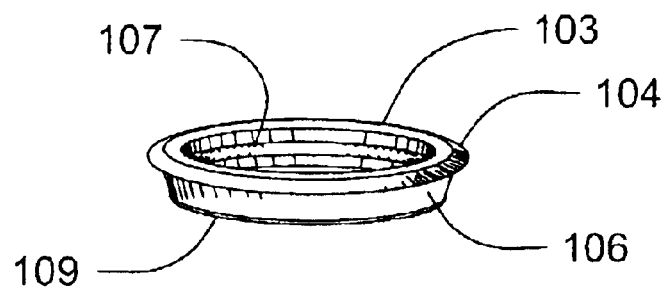
Figure 7B:
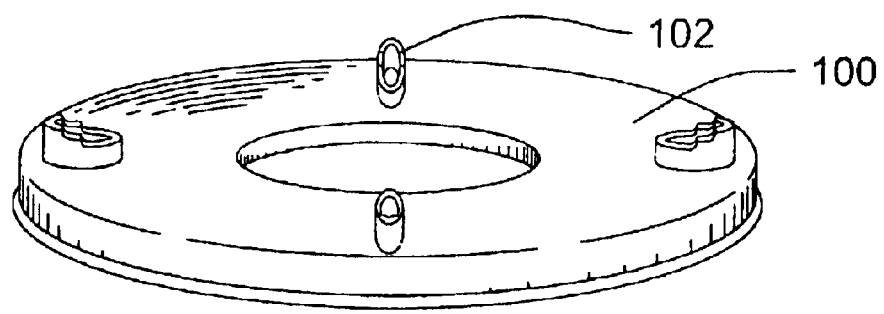

In a first alternative embodiment making use of a grommet type seal against the apparatus post (not shown) as seen in FIG. 7a and FIG. 7b the filter of the present invention includes the conduit 16, bypass and full flow filters 15, 8 and lower end plate 5, in the manner described above. The revision is seen in the top end plate 100, the base plate 110, and the seals for sealing the end plate 100, base plate 110, and housing 1. In this first alternative embodiment, top end plate 100 is similar to that of the prior embodiment except that four leg extensions 102 extend in stepped configuration from the top surface of the top end plate 100. Preferably, the top end plate 100 is molded from a plastic material such as nylon although other suitable materials may be used such as steel.

Fitting into the circular inner opening of the top end plate 100 is a grommet type seal 103 that includes an upper lip 104, a body portion 106 and an inner seal ring 107. The inner seal ring 107 engages the post from the apparatus through which the filter of the present invention is attached to the apparatus such as an engine. The post extends down and through the center of the inner seal ring 107 in sealing engagement when the filter is attached to an appropriate apparatus such as an engine. The terminal end of the inner seal ring 107 includes a small outward facing lip 109 which engages the underside of the top end plate 100 to assist in holding the inner seal ring in place during assembly and use.

Resting on the four leg extensions 102 is the base plate 110. The base plate of the first alternative embodiment does not include inlet ports and, instead, is of solid construction without any such fluid passageways other than the threaded center passageway. The space between the base plate 110 and the top end plate created by the resting of the base plate 110 on the four leg extensions 102 permits the inlet fluid to pass from the apparatus and into the annulus between the housing and the full flow filter 8 between the base plate 110 and the top end plate 100.

The base plate 110 includes a conventional threaded passage (not shown) which engages the threads on the apparatus post (not shown) to frictionally engage the filter of the invention. The base plate 110 also includes an outer lip 141 which is positioned adjacent the outer open end of the housing 1 and which is crimped in place during sealing of the completed filter canister of the present invention. In this alternative embodiment, no seaming lid is necessary. Rather, the components are inserted into the housing 1, the spring 2 compressed, and the terminal end of the open end of the housing 1 is turned over and crimped in sealing over the upper lip of the base plate 110.

A circular seal 150, as described elsewhere herein, is then used to engage the sealed end of the filter and, when in place, to engage the apparatus, such as an engine to effect a seal to prevent leakage of the outlet fluid passing from the apparatus to the filter. The circular seal 150 may take the form of any of such well-known seals and is smooth on the exterior surface. The circular seal 150 preferably includes a lower lip 152 and a body portion 154 connecting the lower lip 152 to an upper lip portion 156 which includes an upper sealing surface 158 and a lower sealing surface 160. The lower lip 152 engages the housing 1 just under the lip created by the folded over and crimped end of the housing. The lower sealing surface 160 likewise engages and seals against the overturned portion of the open end of the housing 1 while the upper sealing surface engages the apparatus, such as an engine. The upper sealing surface 160 may be smooth or include ribs to improve sealing.

Figure 8A:
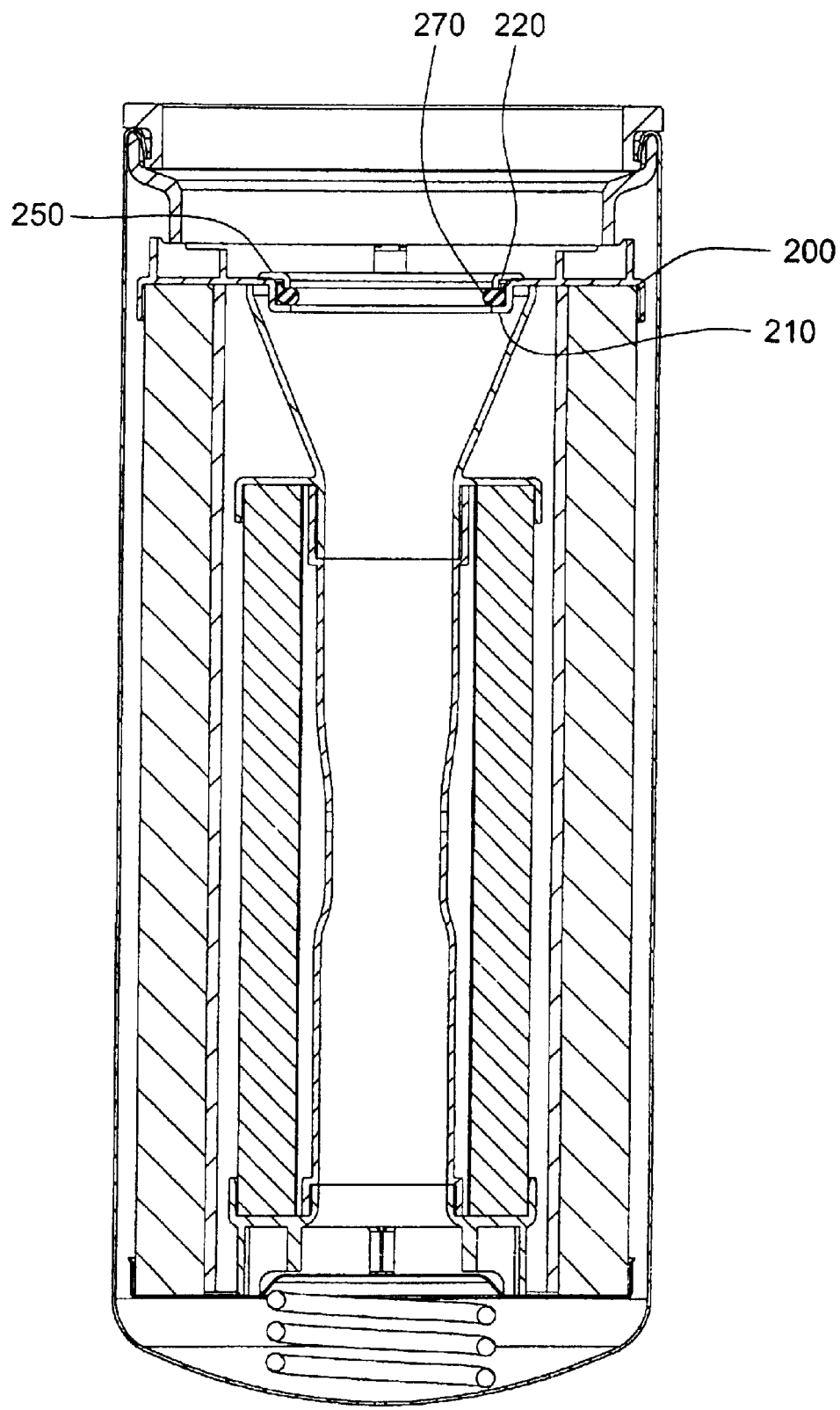
FIG. 8a is a cross sectional view of a second alternate embodiment of the present invention, incorporating a seal clip and a D-ring seal.
Figure 8B:
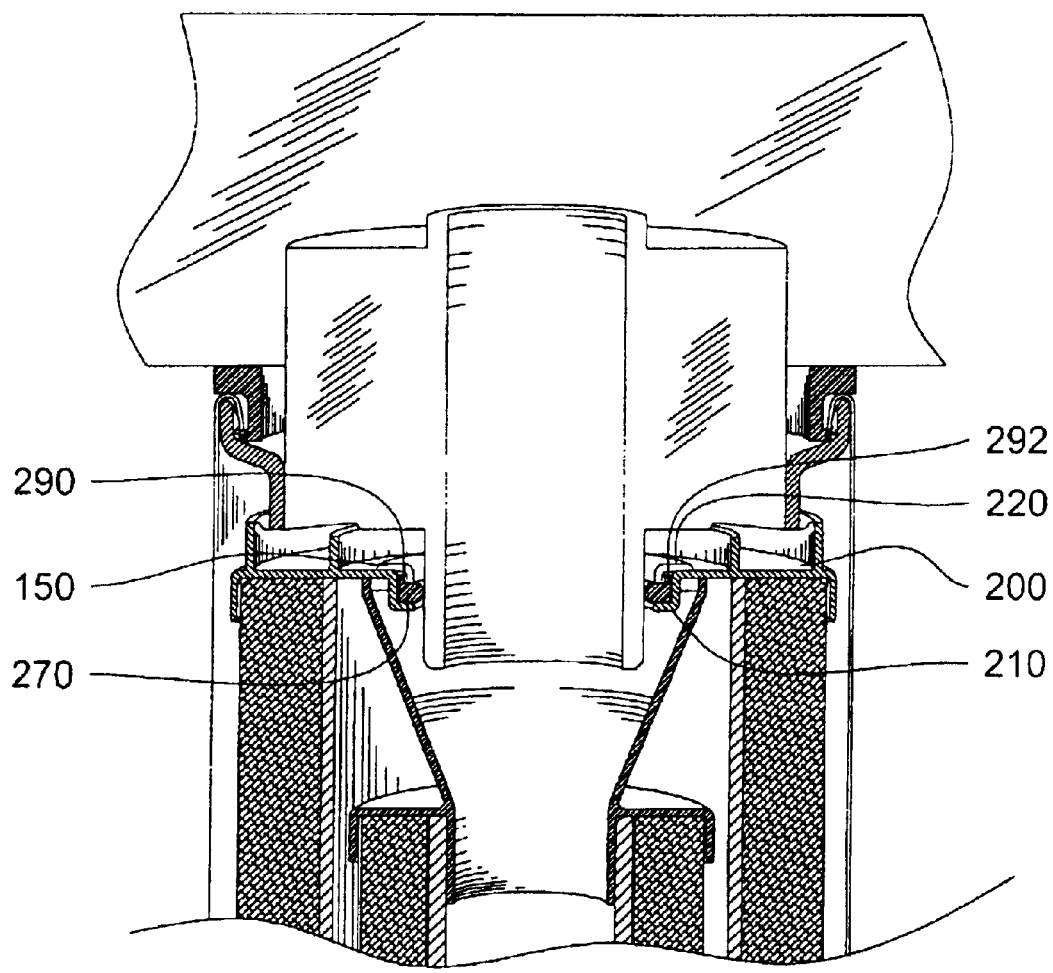
FIG. 8b is a cutaway view showing the second alternate embodiment in connection with an engine.
Figure 8C:
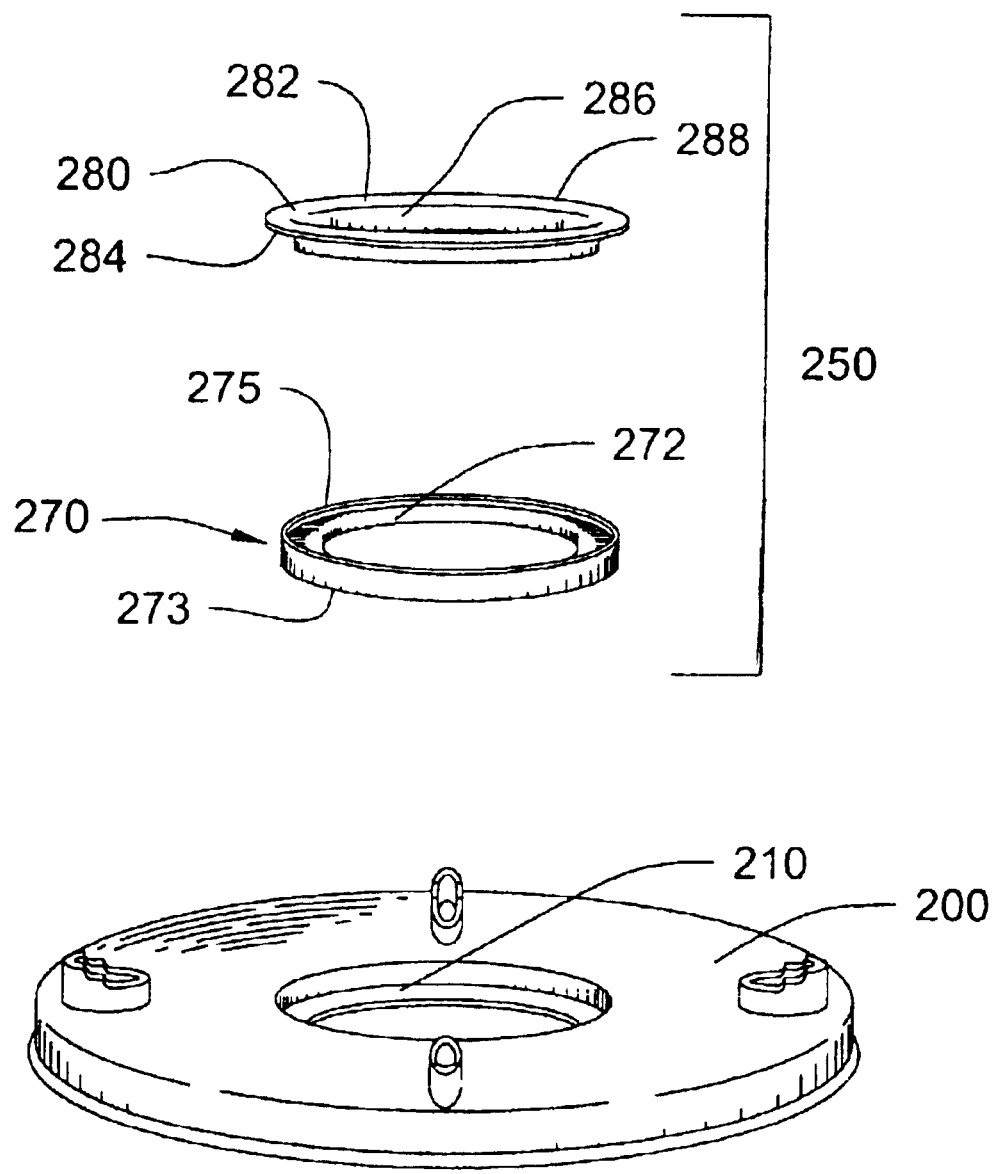
FIG. 8c is an exterior view showing the seal and seal clip incorporated in the second alternate embodiment of the present invention.
Figure 8D:
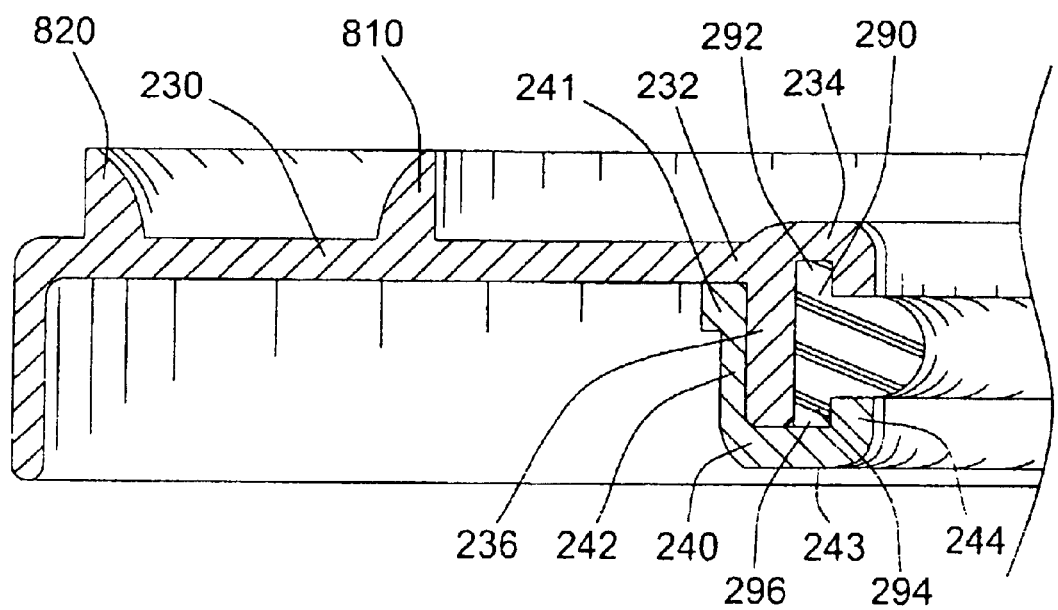
FIG. 8d is a cutaway view showing an alternate D-ring type seal retaining mechanism.

In a second alternative embodiment, as seen in FIGS. 8a, 8b 8c, and 8d, the filter of the present invention is constructed in a similar manner to that described in relation to the first alternative embodiment in relation to FIGS. 7a and 7b, except for a variation to the top end plate 200 and the sealing mechanism 250. In the second alternative embodiment, the sealing mechanism 250 is divided into two separate components, a circular seal 270 and a circular seal clip 280 as seen in, for example, FIG. 8c. The circular seal 270 can be any suitable type of circular seal. Desirably, the circular seal includes at least one raised lip as shown in FIG. 8c. Preferably, the circular seal is a d-ring shaped seal, which are well-known in the art. More preferably, the d-ring shaped seal includes at least one flange, such as a top flange 290, attached to the d-shaped section of the seal which fits within a pocket 292 formed by the seal clip and/or sealing member as seen in, for example, FIG. 8b. Optimally, the d-ring shaped seal includes two flanges, e.g., top flange 290 and bottom flange 294, oppositely positioned on both the lower and upper sides of the d-shaped section of the seal for assisting in retaining the seal, as seen in FIG. 8d.

Figure 13:
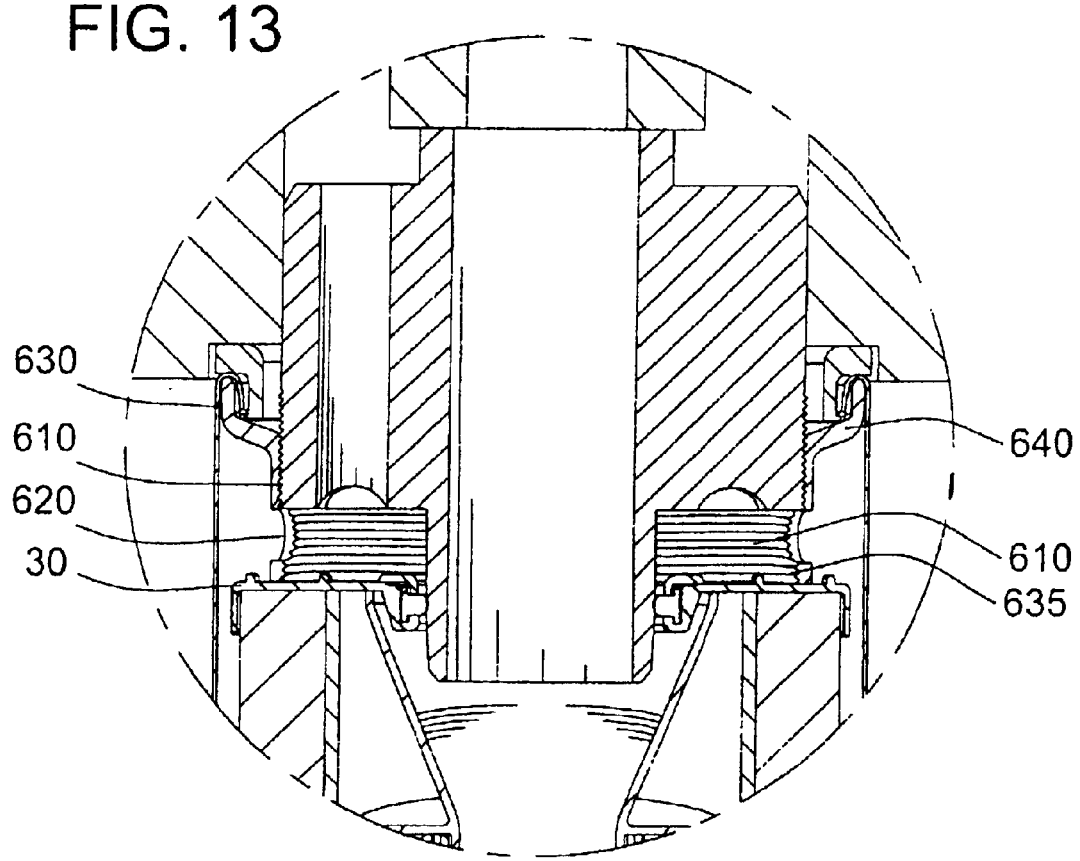
FIG. 13 is a cross sectional view of a fifth alternate embodiment of the invention incorporating the base plate shown in FIG. 12a and FIG. 12b.
Figure 15:
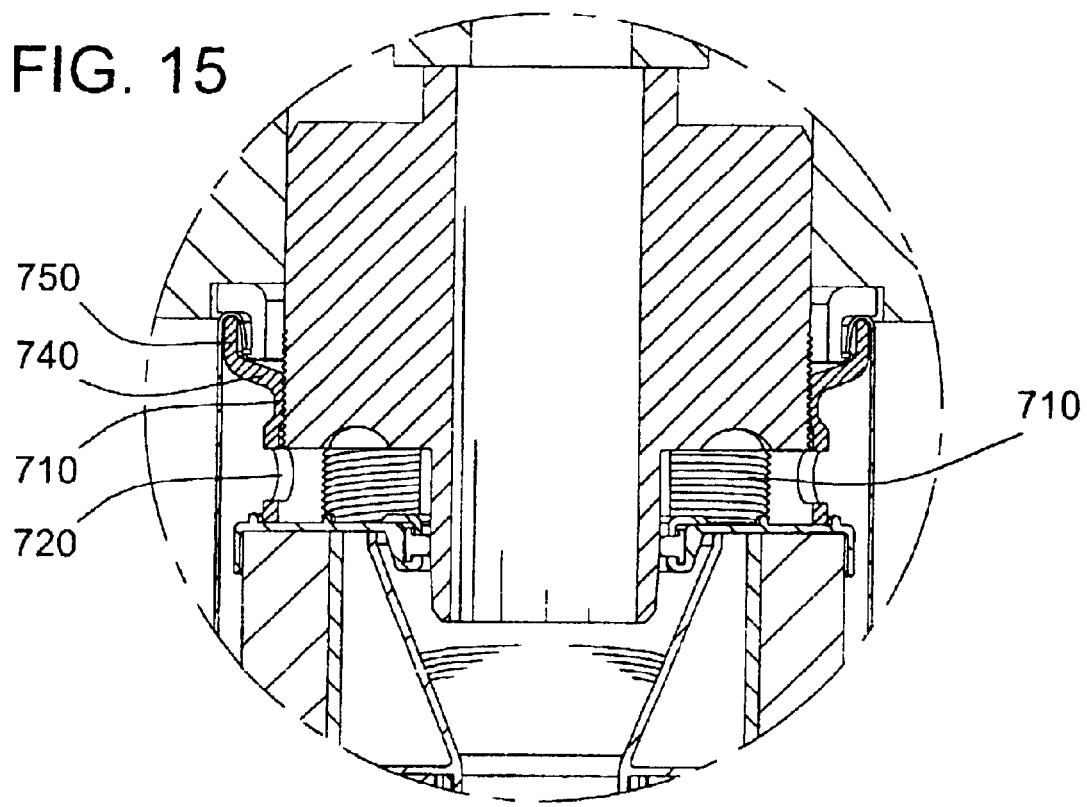
FIG. 15 is a cross sectional view of a sixth alternate embodiment of the invention incorporating the second alternate base plate shown in FIG. 14a and FIG. 14b.

In the second alternative embodiment, the top end plate preferably includes an inner rim 210 extending from the inner edge of the bottom of the inner passageway which supports, or acts as, a sealing member 220. The sealing member 220 can consist of a horizontal member (as shown in FIGS. 8a, 8b and 8c), for example when the inner rim 210 itself acts as the sealing member 220, or, more preferably, the sealing member 220 is an upturned channel-forming d-ring sealing member (as shown in FIG. 13 and FIG. 15) positioned at the interior of the top end cap, which surrounds the outlet transiting through the top end cap. The sealing member 220 forms a seat on which the circular seal 270 rests. The circular seal 270 is further held in position by the seal clip 280, which is attached to the top end of the top end plate and extends below the horizontal level of the top end plate and engages the top end of the circular seal 270 as shown in FIGS. 8a, 8b, 13 and 15.

The seal clip 280 can be composed of any suitable material for binding the circular seal 270. Preferably, the seal clip 280 is composed of nylon. The connection between the seal clip 280 and the top end plate 200 can be accomplished by any suitable bond that retains the seal clip 280 in position and allows the seal clip 280, in conjunction with the d-ring sealing member 220, to engage the circular seal 270. Preferably, the underside of the seal clip 280 is ultrasonically bonded to the top end cap 200.

The circular seal 270 preferably includes an inner sealing surface 272, a lower sealing surface 273, and an upper rim 275. The circular seal rests on or is bonded to the top end plate inner rim 210 and/or sealing member 220 as described herein. The inner sealing surface 272 engages the post from the apparatus through which the filter of the present invention is attached to the apparatus such as an engine. The post extends down and through the center of the inner sealing surface 272 in sealing engagement when the filter is attached to an appropriate apparatus such as an engine.

In assembling the filter of the second alternative embodiment, the circular seal is placed on the sealing member 220. Preferably, a d-ring circular seal is placed between the sealing member 220 and a d-ring seal clip 280, whereby the sealing member and d-ring seal clip engage the d-ring seal. The seal clip 280 preferably includes upper surface 282 and a lower sealing surfaces 284. The seal clip preferably also includes an inner lip 286 and an outer lip 288. The lower sealing surface 284 of the seal clip engages the top surface of the top end plate and the inner lip 286 overlaps and engages the upper rim 275 of the circular seal 270. The upper surface 282 of the seal clip engages the base plate, which, preferably, is identical to that of the first alternative embodiment.

Other alternative configurations of the aforementioned elements of the invention are possible in embodiments incorporating a d-ring type seal. The arrangement between a d-ring seal clip and a d-ring sealing member, if incorporated, can be any suitable arrangement for maintaining the d-ring in position. For example, in a particular embodiment incorporating a d-ring seal having two oppositely positioned flanges and an alternate mechanism for retaining a d-ring seal as seen in FIG. 8d, a d-ring clip 240 is positioned to engage the d-ring seal. The top end plate 230, in such an embodiment, preferably includes an r-shaped d-ring sealing member 232, attached to, or integrally formed with, the top end plate 230, which is positioned at the interior rim of the top end plate, which surrounds the outlet (not shown) transiting through the top end plate. The r-shaped d-ring sealing member comprises an overturned top end 234 and a body section 236. The top end 234 of the r-shaped d-ring sealing member forms an overturned pocket 292 suitable for retaining the top flange 290 of a d-ring seal having two opposite flanged sides as shown in, for example, FIG. 8d. The body section 236 forms a straight section protruding into the interior of the filter apparatus, at the interior rim of the top end plate 230, transiting inward perpendicular (or about perpendicular) to the body of the top end plate 230.

Preferably, the d-ring clip 240 includes a short horizontal top section 241 that is connected to a vertical body section 242, which is oriented perpendicular (or about perpendicular) to the top section and extends the length of the body section 236 of the d-ring sealing member. The body section 242 is connected to a horizontal bottom section 243, which is further connected to an upturned inner section 244. The bottom end of the body section 236 of the d-ring sealing member is seated on, and preferably attached to, the top end of the bottom section 243 of the d-ring clip. The top section 241 engages, and preferably is attached to, the bottom end of the top end plate 230, and fits within the corner formed at the juncture of the interior side of the body of the top end plate and the interior side of the body section 236 of the d-ring sealing member. The upturned inner section 244 and bottom section 243, in concert with the interior side of the bottom end of the body section 236 of the d-ring sealing member forms a pocket 296 capable of retaining the bottom flange 294 of the two-side flanged d-ring seal.

The d-ring clip 240 is attached to the d-ring sealing member and/or top end plate by any suitable attachment capable of maintaining a form for retaining a d-ring seal. Preferably, the d-ring clip 240 is sealed by ultrasonic bonding. More preferably, the d-ring clip 240 is sealed to the top end plate 230 and integrally formed d-ring sealing member by ultrasonic bonds between the top section of the d-ring clip 241 and the interior side of the top end plate 230 and by a second ultrasonic bond between the bottom portion of the d-ring clip 243 and the bottom of the body section 236 of the d-ring sealing member.

In addition to the different possible configurations of the base plate and seaming lid components described herein, various transitions between the conduit and outlet of the filter apparatus can also be incorporated in the context of the present invention. For example, a third alternate embodiment of the present invention, shown in FIG. 9, incorporates such an alternate transition in the context of a filter apparatus having a housing 300, which comprises a separated inlet 335 and outlet 330 therein. Due to the separated inlet 335 and outlet 330, this third alternate embodiment does not incorporate a base plate, and may or may not utilize a seaming lid. Filters incorporating housings with similar separated inlet and outlet components are known in the art, such as those described in U.S. Pat. Nos. 5,342,511 and 5,078,877.

Figure 9:
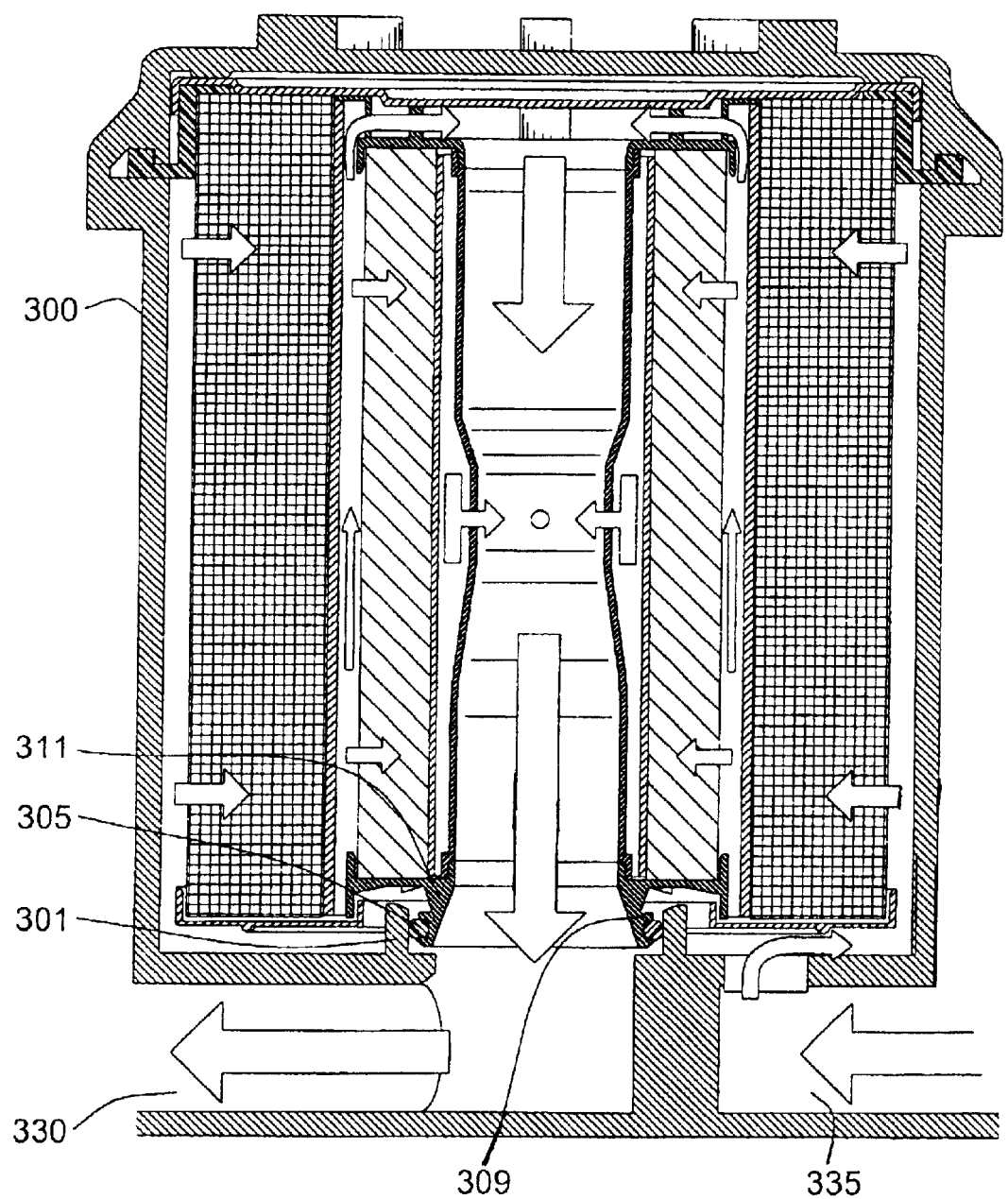
FIG. 9 is a cross sectional view of a third alternative embodiment of the present invention.

The filter of the third alternate embodiment of the invention shown in FIG. 9 includes among the replaceable components of the apparatus, full flow and bypass filters (as described herein) and a venturi conduit, concentrically arranged around each other within housing 300. Similar to other embodiments described herein, the conduit of the third alternate embodiment comprises a pressure reduction section, comprising a section of reduced diameter located near the center of the conduit. Located near the pressure reduction section is one or more bypass conduits, preferably two simple orifices as described elsewhere herein.

Attached to, or integrally formed as a component of, the downstream end of the conduit of the third alternate embodiment is a horn-shaped transition section 311. The horn-shaped transition section 311 has a diameter greater than the downstream end of the conduit of the third alternate embodiment, and which gradually increases in diameter towards its downstream end. The exterior of the horn-shaped transition section 311 is surrounded by a top end cap sealing member 309, which encircles the outside of the horn-shaped transition section 311, near the downstream end of the horn-shaped transition section.

The top end cap sealing member 309 sealingly engages an O-ring 305, preferably by an O-ring groove in the top end cap sealing member (not shown). The O-ring 305 is attached to the interior of the housing 300 of the third alternate embodiment, preferably attached to a conduit support 301, which comprises a structure, preferably circular in shape, that protrudes into the interior of the housing 300 of the third alternate embodiment, and which preferably encircles the outlet 330 of the filter apparatus. Thus, the connection between the top end cap sealing member 309 and O-ring 305 secures the horn-shaped transition section 311 in position such that the downstream end of the horn-shaped transition section 311 communicates with the outlet 330.

Figure 10:
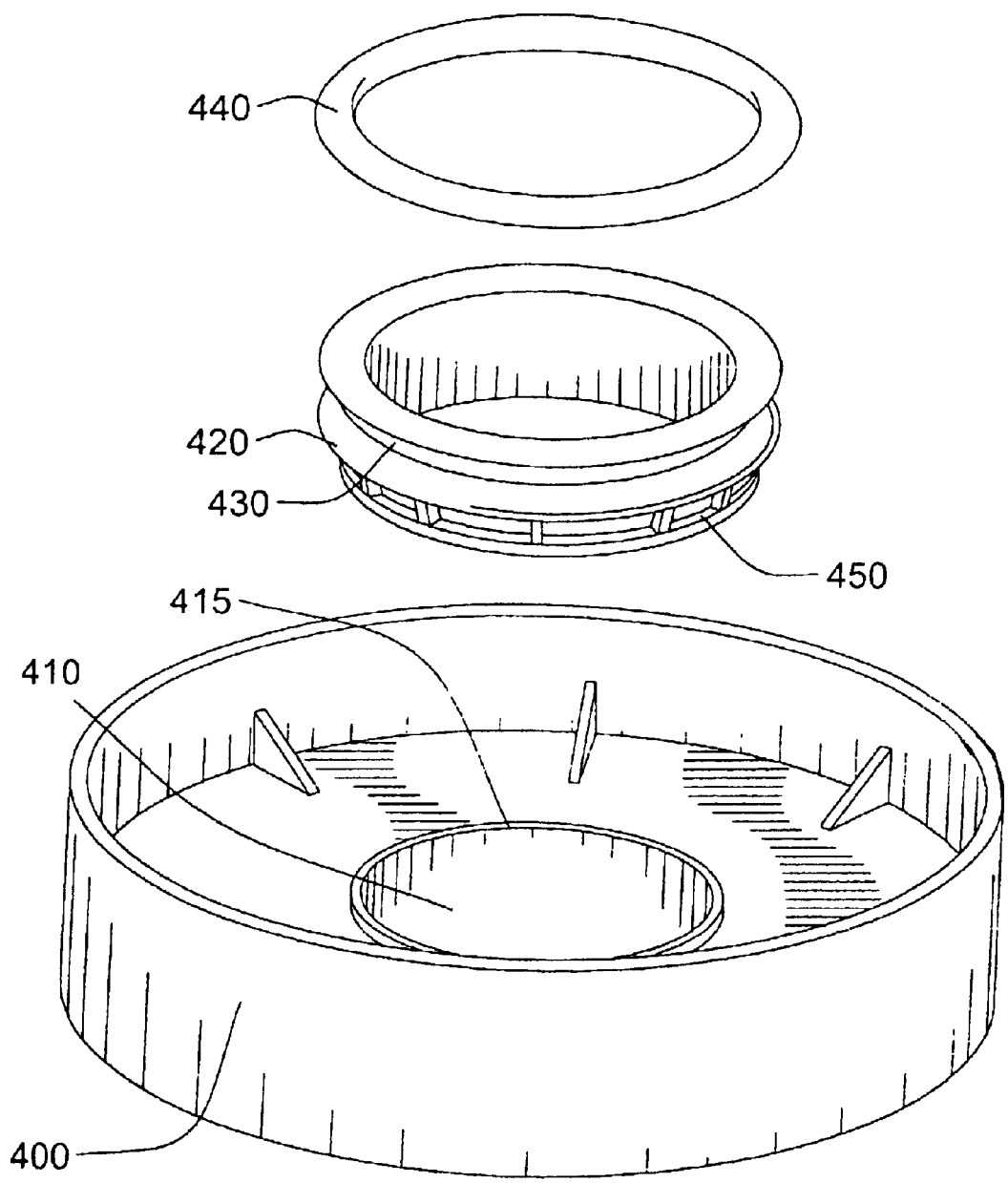
FIG. 10 is an exploded view of an alternate top end cap configuration of the filtering apparatus.

In other alternative embodiments of the present invention, it may also be desirable to exclude both a base plate transition and a horn section (or horn-shaped transition section) between the conduit and the outlet of the filter apparatus. An example of such an alternate embodiment of a top end cap design that excludes a horn section is shown in FIG. 10. In this embodiment, a top end cap 400 comprising a circular end cap encircling an outlet 410 is incorporated. The top end cap 400 has a relatively uniform diameter (i.e., versus a horn section or horn-shaped transition section described elsewhere herein), and is attached to a top end cap sealing member 420, preferably by welding the top end cap sealing member within the upper rim 415 of the top end cap outlet to the lower portion 450 of the top end cap sealing member. The top end cap sealing member 420 has an O-ring groove 430 which engages an O-ring 440. The O-ring 440 can be attached to any suitable structure within the filter apparatus, such as attachment to conduit supports protruding into the interior of the housing (not shown).

Figure 11:
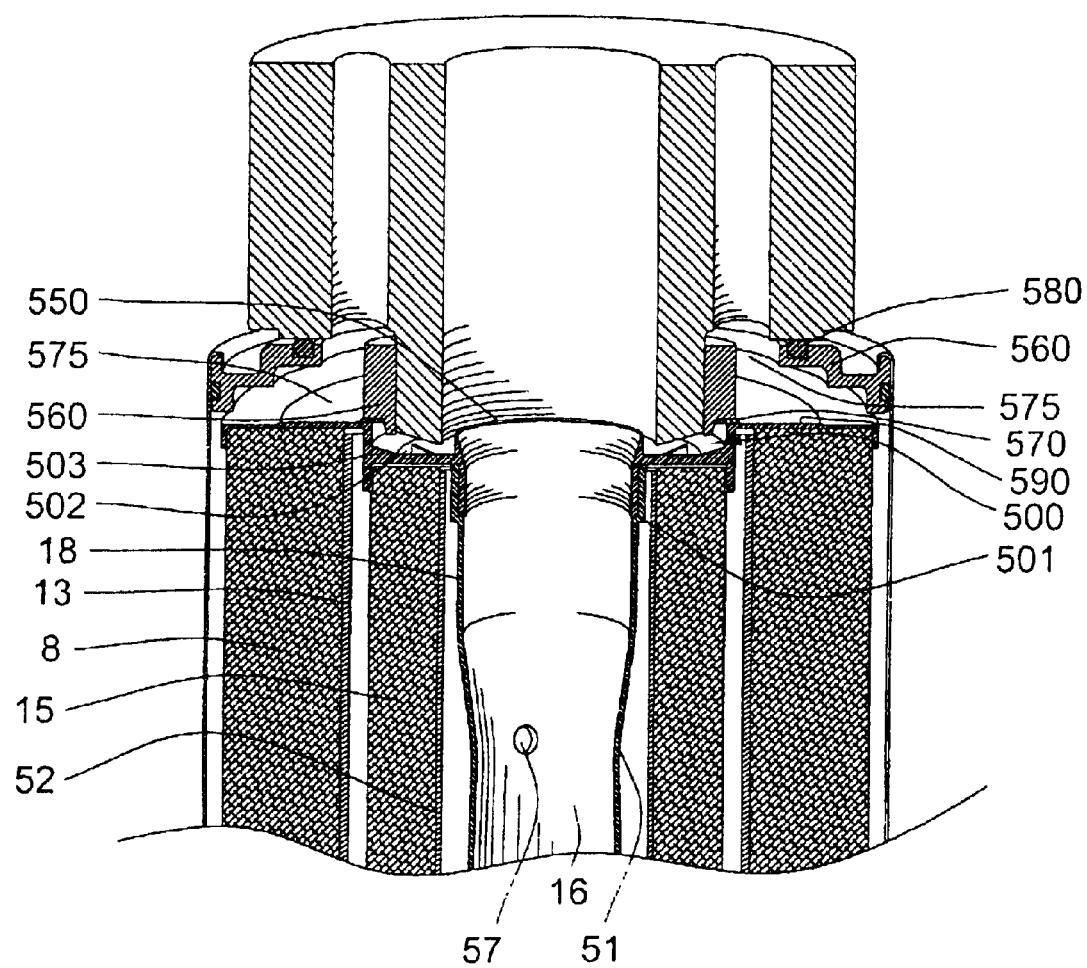
FIG. 11 is a cross sectional view of a fourth alternate embodiment of the present invention.

Another example of an embodiment of the present invention that does not incorporate a base plate or horn section in the transition from the downstream end of the conduit to the outlet, is shown in FIG. 11. In this embodiment, a filtering apparatus incorporating a venturi conduit 16 comprising a pressure reduction section 51 and bypass port 57, is concentrically surrounded by bypass and full flow filters, and a housing, as described elsewhere herein.

At the downstream end of the conduit 51, the conduit engages a top end cap 500. The top end cap 500 comprises a conduit sealing member 501, consisting of a hollow tubular section extending above and below a solid top bypass filter support. The conduit sealing member 501 sealingly engages the interior of the downstream end of the conduit (fitting therein) and thereby communicating therewith to allow fluid exiting the conduit to pass through to the outlet 550 and into a connected apparatus, such as an attached engine base.

The top end cap 500 of this embodiment further comprises a top bypass filter support 502 and a t-shaped side bypass filter support 503. The interior end of the t-shaped side bypass filter support 503 and the top bypass filter support 502 in combination with the exterior of the downstream end of the conduit 510 form a u-shaped channel wherein the top end of the bypass filter 15, is sealingly engaged, as described with reference to other embodiments herein.

The exterior end of the t-shaped side bypass filter support 503 engages an end cap seal 570 and/or a full flow top end cap 590, and sandwiches the end cap seal 570 between the t-shaped side bypass filter support 503 and a circular base plate 560 or the full flow top end cap 590, which in turn engages the circular base plate 560. The full flow top end cap 590 thus engages the top end cap, and maintains the top end of the full flow filter 8 and the top end of the full flow filter support tube 13 in position, as described with regards to other embodiments herein. The end cap seal 570 ensures that fluid mixed with impurities entering the filtering apparatus through an inlet 575 does not mix with filtered fluid exiting the outlet 550.

The base plate 560 engages a circular apparatus seal 580, sandwiching the circular apparatus seal between the attached apparatus (e.g., an engine as shown) and the filtering apparatus of the present invention, securing the filtering apparatus in relation to an attached apparatus. Thereby, the downstream end of the conduit can communicate with the outlet 550 and directly into an attached apparatus, such as the base of an engine as shown. An embodiment of the invention as shown in FIG. 11, that incorporates such a direct transition without a horn section can provide better direction of flow of fluid from the conduit of the filtering device of the present invention.

The present invention alternatively provides a filtering apparatus incorporating alternate base plates, wherein the base plate rests directly upon and/or is sealingly engaged to the top end cap. In such embodiments of the invention it is preferable that the inlet ports are positioned within the threaded passage of the base plate, versus being arranged in an array around the uppermost portion (i.e., the base plate lip) as described elsewhere herein. In such embodiments no support legs or other spacing arrangement between the top end cap and base plate or end plate is required to permit flow into the filter. Consequently, the full flow and/or bypass filters in such embodiments may have increased length, thereby increasing the overall performance of the filter apparatus. Moreover, in such embodiments the need for seals between the base plate and the top end cap can be reduced or eliminated.

Figure 12A:
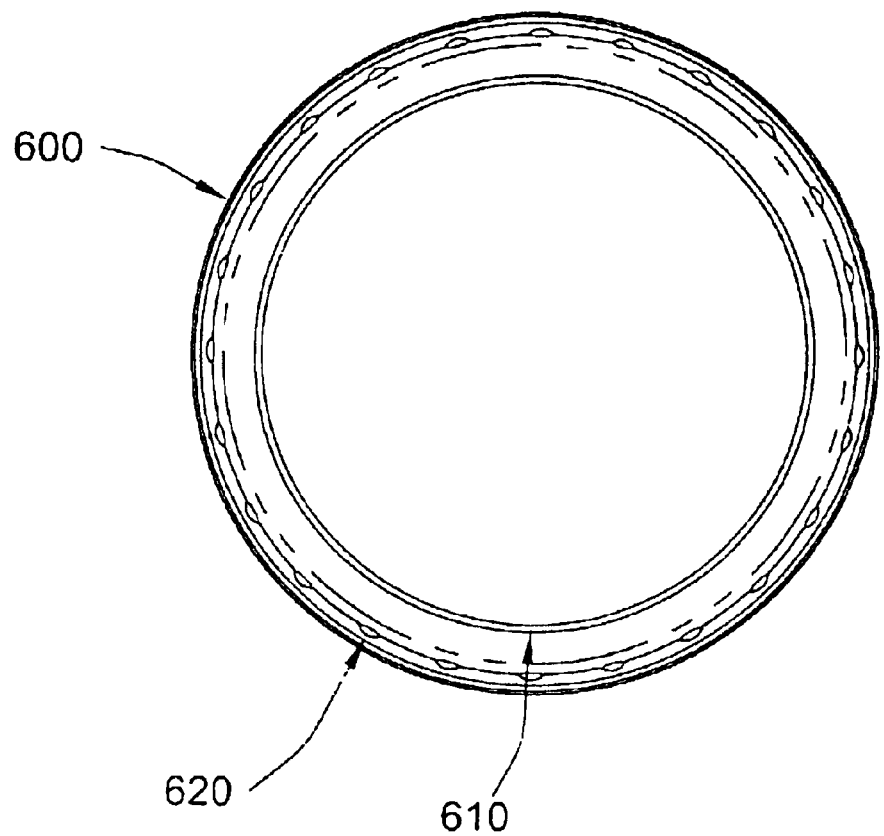
FIG. 12a is top view of an alternate base plate of the present invention.
Figure 12B:
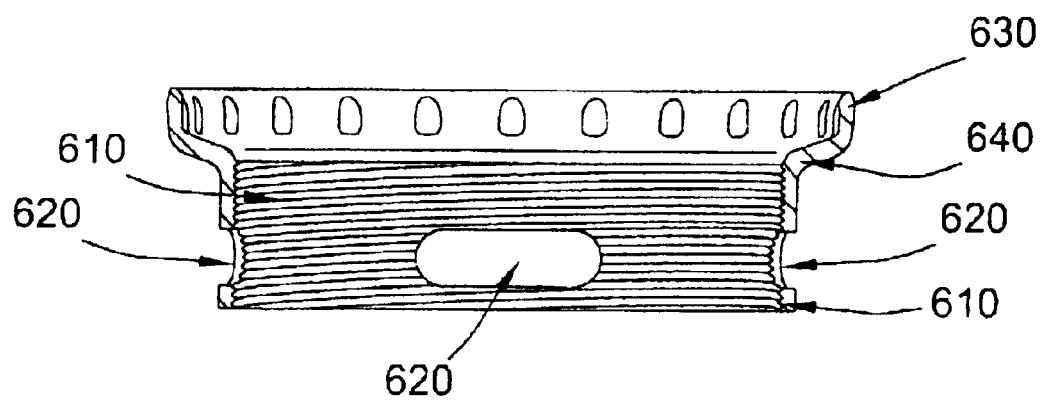

In a first alternate base plate embodiment of such an apparatus, as shown in FIG. 12a, FIG. 12b and FIG. 13, the invention provides a base plate 600 that comprises a circular threaded passage 610 through which inlet ports 620 are positioned. Preferably, the base plate comprises a transition portion 640, an outer lip 630, and a threaded portion 610 through which the inlet ports 620 pass. The inlet port 620 can comprise any suitable orifice transiting through the threaded portion 610. Preferably, the inlet port 620 comprises a slotted hole having a chamfer (or being chamfered) around the slotted hole.

The terminal end 635 of the base plate 600 abuts the top of the top end cap 30. Inlet fluid passes through the inlet ports 620 and into the inlet annulus between the housing and the full flow filter.

A second alternate base plate embodiment of such an apparatus is shown in FIGS. 14a, 14b and 15. This embodiment is similar to that of FIGS. 12a, 12b and 13. In this embodiment a base plate 700 having a circular threaded passage 710, an outer lip 750, a transition portion 740, and four stepped areas 730, is incorporated into the apparatus of the interior present invention. The stepped areas 730 are positioned at about equal distance from each other around the center of the threaded passage (i.e., the outlet in such an embodiment), and are formed by removing a portion of the wall thickness of the threaded passage 710. The stepped areas 730 can be integrally formed with or created by removing material after initial formation of the threaded passage portion 710 of the base plate. The stepped areas form inlet chambers 760, comprising the space between the stepped area 730 and the threaded passage 710. An inlet port 720 is placed within each stepped area 730. The inlet port 720 can comprise any suitable orifice, preferably comprising a slotted hole having a chamfer (or being chamfered) around the slotted hole. In operation, inlet fluids may pass around the terminal end of the post and either through the inlet port directly or pass through the space between the stepped area and the post and then into and through the inlet port. The inlet fluid then passes to the annulus between the housing and the full flow filter.

Figure 16:
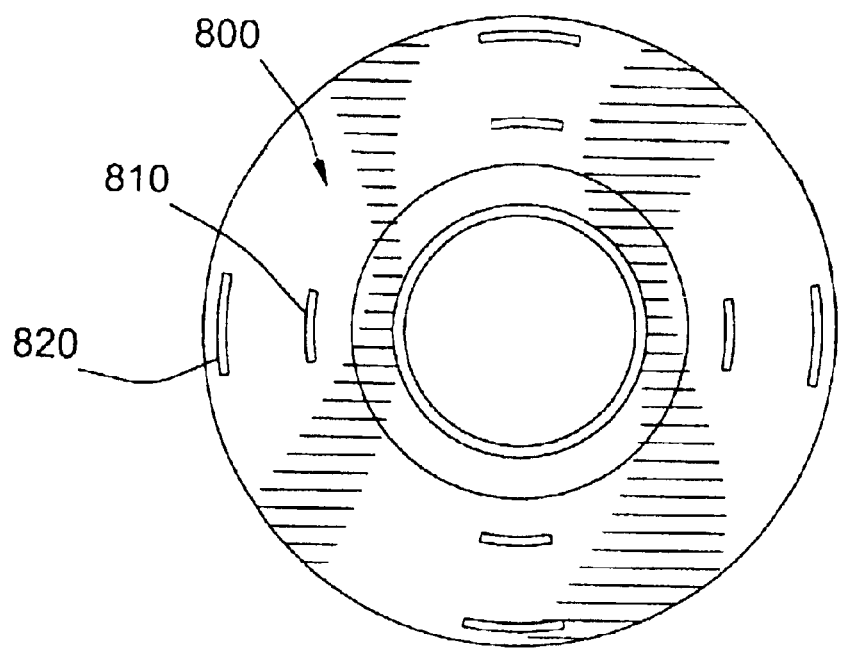
FIG. 16 is a top view of an alternate top end plate component of the invention.
Figure 16A:
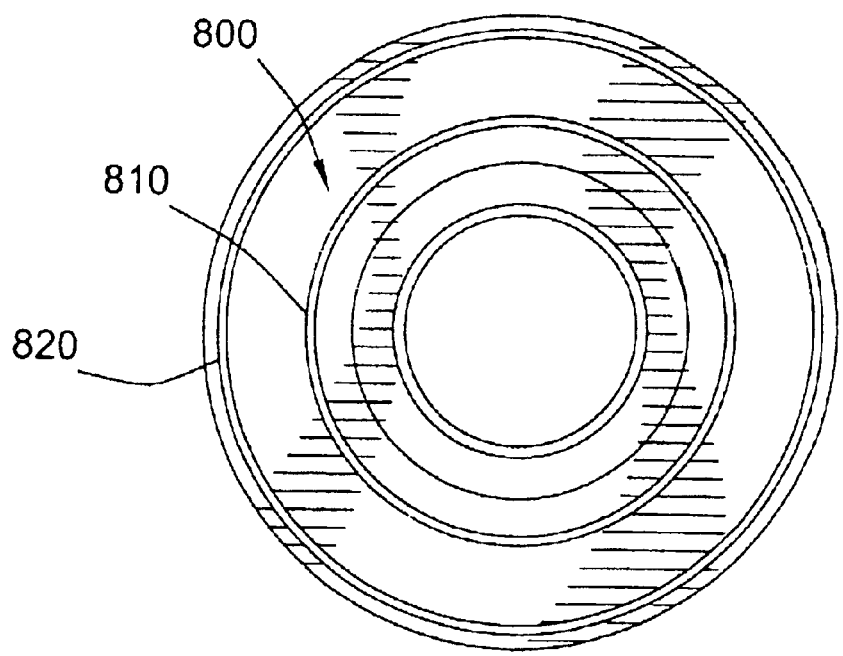
FIG. 16a is a top view of a second alternate top end plate component of the invention.

In those embodiments of the invention incorporating the alternate base plate embodiments, described in the preceding paragraphs, it is preferable to utilize alternate top end plates having improved capacity for maintaining position of the base plate and other elements of the filter apparatus, as shown in FIG. 16 and. FIG. 16a. In such embodiments the top end plate 800 includes inner positioning tabs 810 and outer positioning tabs 820 that consist of sections on the exterior of the top end plate 800 that are raised to suitable level to assist in the positioning of the base plate during the assembly of the filter apparatus. The bottom of the base plate fits within the space between inner positioning tabs 810 and outer positioning tabs 820, and the inner positioning tabs 810 and outer positioning tabs 820 engage the inner and outer peripheries of the base plate such that the assembled filter components of the filtering apparatus are maintained in a stable position on the base plate while the spring is applied and filter apparatus sealed, as described elsewhere herein. The inner positioning tabs and outer positioning tabs can be in any arrangement suitable for maintaining the base plate in position during assembly. Preferably, the positioning tabs are arranged in separated areas as shown in FIG. 16. In another alternative preferred embodiment, the positioning tabs form continuous rings on the top surface of the top end cap, as shown in FIG. 16a.

In operation of the filter of the present invention, fluid flows into the filter after passing from the apparatus outlet and through either the base plate passages (which can be positioned either within the threaded passage of the base plate or elsewhere therein), between the base plate and top end plate, or directly into a separated inlet and through an inner inlet. The fluid then passes into the inlet annulus 3, where it is contained by the walls of the housing 1, the bottom end plate 5, and the upstream side 9 of the full flow filter. The inlet fluid then flows through the full flow filter 8, exiting through the full flow filter's downstream side 10 and the full flow support tube.

After passing through the full flow filter 8 and support tube, the fluid is in the full flow annulus 14. Fluid within the full flow annulus 14 may then pass through the bypass filter 15, into the bypass annulus 53 and then through the venturi bypass port 57 and into the conduit 16, or the fluid may pass from the full flow annulus through the flow passages 27 and into the conduit 16. Thus, the full flow filtered fluid will either pass directly through the conduit and out of the filter or will be further filtered by the bypass filter 15 and then flow out of the filter. Given the relative sizes of the flow passages 27 as compared to the bypass port 57, the path of least resistance for the fluid generally will be through the flow passages 27, and a majority of the fluid usually will flow through the flow passages.

To promote flow across the bypass filter 15, without requiring a pump, a pressure differential is created across the bypass filter that promotes such flow. The conduit 16 in the present embodiment of the invention accomplishes this in part by taking the form (at least in part) a venturi or other suitable pressure reduction configuration. Thus, the conduit 16 has a pressure reduction section 51 (preferably comprising a venturi throat 55) whereby flow speed of the fluid through the conduit 16 is increased, and thus pressure is lowered within the conduit 16. This lower pressure results in a pressure differential across the bypass filter 15 communicated via the bypass port 57 which is positioned in the pressure reduction section 51, preferably at the throat 55, the narrowest portion of the conduit 16. This lowering of pressure within the conduit 16 is in accordance with Bernoulli's principle. In view of Bernoulli's principle, if the velocity of fluid flow is v, a pressure p, a density of the fluid w, and the acceleration of gravity g; then the effect of using the conduit 16 having a pressure reduction section 51 can be expressed by the formula:

$$p/w + v2/(2\ g) = \text{constant.}$$

Thus, by decreasing the cross-sectional area of the conduit 16 abruptly, the velocity v of the fluid flow within the conduit 16 is increased in the area with the reduced cross sectional area, and thus pressure within the conduit is decreased. This effect promotes flow across the bypass filter 15 through creating a lower pressure within the conduit 16 than within the bypass annulus 53, thereby promoting flow through the bypass filter 15 and the bypass port 57 into the conduit 16. Because pressure differential drives fluid through the bypass filter 15, a portion of the fluid passes through both the full flow filter 8 and the bypass filter 15.

The present invention provides apparatuses and methods wherein the amount of fluid that is to be drawn across the bypass filter 15 can be predetermined, in an at least significant part, by varying the size of the bypass port 57 and/or by increasing the number of bypass ports. Because flow rate is proportional to the cross-sectional area of any orifice, by changing the cross-sectional area of the bypass port 57 the velocity of fluid entering the conduit 16, and thus the resulting pressure change from the bypass annulus 53 to within the conduit 16, can be pre-determined.

Similarly, the amount of narrowing of the diameter of the pressure reduction section 51 and/or the diameter of the upstream 17 and downstream 18 ends of the conduit can also be varied to increase or decrease the draw of fluid across the bypass filter 15. Thus, by changing the size of the diameter of the conduit at the pressure reduction section 51, and upstream 17 and downstream 18 ends, alone or in combination with changing the size of the bypass port(s) 57, the present invention provides methods and apparatuses whereby a pre-determined amount of fluid can be filtered through both the full flow 8 and the bypass 15 filters.

were selected having either (1) only a full flow filter, or (2) a full flow filter, bypass filter, and conduits having two opposite positioned bypass ports with about 0.176 inch diameters, various internal diameters in the pressure reduction section, and various internal diameters in the upstream and downstream ends of the conduit (as measured at about the middle of either the upstream or downstream end).

These filters were separately subjected to test fluid and the removal efficiency of the filters was determined using the Society of Automotive Engineers specification entitled "Full Flow Lubricating Oil Filters-Multipass Method For Evaluating Filtration Performance"—SAE J1858 (June 1988). The filters described above were subjected to the referenced protocol's test fluid having contaminants with particle diameters of 3, 5, 7, 10, 15, and 20 microns, respectively. The contaminant removal efficiency (removal efficiency) of the full flow filter alone, as well as the combined full flow and bypass filters when used with a conduit (with different conduit and pressure reduction section diameters) was then measured according to the referenced protocol. The results of these experiment are shown in Table 1.

TABLE 1

| | Filter Specifications (in inches) | | | | | |
|---|---|---|---|---|---|---|
| | Full flow filter only | 0.813 (CD) 0.5 (PRSD) | 1.03 (CD) 0.6 (PRSD) | 1.03 (CD) 0.6 (PRSD) | 1.03 (CD) 0.7 (PRSD) | 1.125 (CD) 0.8 (PRSD) | 1.125 (CD) 0.95 (PRSD) |
| Particle size (in microns) | Removal Efficiency (%) | | | | | |
| 3 | 51.79 | 54.99 | 61.84 | 60.34 | 67.64 | 70.02 | 69.91 |
| 5 | 64.96 | 64.69 | 67.95 | 73.03 | 71.74 | 76.96 | 79.44 |
| 7 | 72.48 | 74.79 | 79.81 | 78.5 | 82.59 | 84.93 | 85.02 |
| 10 | 83.46 | 85.36 | 88.45 | 87.7 | 90.33 | 91.86 | 92.66 |
| 15 | 96.07 | 94.64 | 97.38 | 96.5 | 97.83 | 98.06 | 97.86 |
| 20 | 99.13 | 98.49 | 99.8 | 99.4 | 99.63 | 98.93 | 99.99 |

(CD) = Conduit diameter;
(PRSD) = Pressure Reduction Section Diameter

Both the fluid flowing only through the full flow filter 8, and the fluid passing through both the bypass filter 15 and the full flow of filter 8, then mix in the conduit 16. This mixed fluid will then flow to the downstream end 18 of the conduit and ultimately out of the filter and back to the engine.

In the manner explained above, the bypass filter 15 effectively removes the impurities of small size from, a pre-determined amount of fluid, while the impurities of large size are captured by the full flow filter 8. However, the present invention is not limited to the features explained above; rather, many modifications and alternations can be conceived by those skilled in the art within the scope of the invention. For instance, the full flow and bypass filters may be formed in various manners and of various materials as mentioned above.

The following example further illustrates the present invention, but, of course, should not be construed as in any way limiting its scope.

EXAMPLE

This example demonstrates the effectiveness of the apparatus and method of the claimed invention to filter a pre-determined amount of fluid by both full flow and bypass filtration.

Filter apparatuses incorporating the features of the first embodiment of the present invention, as described herein, The results of these experiments, shown in Table 1, indicate that the combination of a full flow filter and bypass filter with a conduit having a pressure reduction section improved filtration over systems that relied on full flow filtration only. Moreover, the results of these experiments demonstrate that by varying the internal diameter of the conduit (e.g., at the upstream and downstream ends) and the pressure reduction section of the conduit, improved contaminant removal efficiency by the combination of the full flow and bypass filters is achieved. Furthermore, the results of the experiments demonstrate that by varying the diameter of the upstream and downstream ends and the pressure reduction section of the conduit of the present invention relatively, a pre-determined amount of fluid can be filtered by both full flow and bypass filtration and a predetermined filtration efficiency may be arrived at.

The predetermined percentage of flow through the bypass filter may be calculated using the measured reduction in particulates in conjunction with the stated efficiency of the bypass filter as compared to the filtration achieved by the full flow filter alone. The reduction of impurities attributable solely to filtration by the bypass filter coupled with that filter's efficiency permits the calculation of the percentage of total flow passing through the bypass filter.

All of the references cited herein, including patents, patent applications, and publications, are hereby incorporated in their entirety by reference. The use of the terms "a" and "an" and "the" and similar referents (e.g., "a base plate" or "the bypass conduit") in the context of describing the present invention (especially in the context of the following claims) should be construed to cover both the singular and the plural, unless otherwise indicated herein or clearly contradicted by context.

While this invention has been described with an emphasis upon the preferred embodiments, it will be obvious to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A filter, comprising:
   a housing;
   an inlet port;
   an outlet port;
   a first filter element contained inside of the housing, the first filter element comprising a tubular shaped first filtering media;
   a bypass filter element comprising a tubular shaped bypass filtering media, the bypass filtering media disposed radially inside of the first filtering media with the bypass filtering media extending through an area between opposed axial ends of the first filtering media;
   a venturi conduit extending at least partially through the bypass filter element, the venturi conduit having a first entrance port and a second entrance port, the second entrance port being proximate a narrowed neck section of the of the venturi conduit for creating a venturi effect for drawing fluid through the bypass filtering media;
   a first collection chamber between the bypass filter element and the first filter element;
   a second collection chamber between the venturi conduit and the bypass filter element;
   wherein the filter defines a first flow path for fluid running from the inlet port, through the first filter element, through the first collection chamber to the first entrance port, and through the venturi conduit to the outlet port; and
   wherein the filter defines as second flow path for fluid running from the inlet port, through the first filter element to the first collection chamber, through the bypass filter element to the second collection chamber through the second entrance port and to the outlet port.

2. The filter of claim 1 wherein the first filter media and the bypass filter media are generally cylindrical.

3. The filter of claim 2 wherein the first and second collection chambers are tubular, generally cylindrical chambers.

4. The filter of claim 2 wherein the bypass filtering media is concentrically disposed completely inside of the first filtering media with the bypass filtering media completely contained axially inside of opposed axial ends of the first filtering media.

5. The filter of claim 2, wherein the housing includes a closed end, a mounting end and a cylindrical sidewall therebetween, the mounting end defining the inlet port and the outlet port, further comprising:
   first top and bottom end caps engaging opposed ends of the bypass filtering media;
   second top and bottom end caps engaging opposed ends of the of the first filtering media, the second top and bottom end caps also engaging the first top and bottom end caps, respectively; and
   a spring supported by the closed end, acting upon the second bottom end cap and urging all of the end caps and the filtering medias toward the mounting end.

6. The filter of claim 5 wherein the first and second end caps engage opposing ends of the venturi conduit.

7. The filter of claim 5 wherein the first end cap defines throughport means for fluidically communicating fluid from the first collection chamber to the first entrance port.

8. The filter of claim 1 wherein the first and second flow paths are the only flow paths for fluid through the filter between the inlet port and the outlet port.

9. The filter of claim 1, wherein the first and second flow paths intersect each other inside venturi conduit upstream of the outlet port.

10. A filter, comprising:
    a housing extending between a closed end and a mounting end, the mounting end including an inlet port and an outlet port;
    a first filter element contained inside of the housing, the first filter element comprising a tubular shaped first filtering media;
    a bypass filter element comprising a tubular shaped bypass filtering media, the bypass filtering media disposed radially inside of the first filtering media with the bypass filtering media extending through an area between opposed axial ends of the first filtering media;
    a venturi conduit extending at least partially through the bypass filter element, the venturi conduit having a first entrance port and a second entrance port, the second entrance port being proximate a narrowed neck section of the of the venturi conduit for creating a venturi effect for drawing fluid through the bypass filtering media;
    a first collection chamber between the bypass filter element and the first filter element; and
    a fluid passageway extending radially inward around an end of the of the bypass filter element to fluidically connect the first collection chamber with the first entrance port of the venturi conduit.

11. The filter of claim 10 further comprising a second collection chamber between the venturi conduit and the bypass filter element.

12. The filter of claim 10 wherein the first filtering media and the bypass filtering media are generally cylindrical.

13. The filter of claim 12 wherein the first collection chambers is a tubular, generally cylindrical chamber.

14. The filter of claim 12 wherein the bypass filtering media is concentrically inside the first filter element and is completely contained axially inside of opposed axial ends of the first filtering media.

15. The filter of claim 12, further comprising:
    first top and bottom end caps engaging opposed ends of the bypass filtering media;
    second top and bottom end caps engaging opposed ends of the of the first filtering media, the second top and bottom end caps also engaging the first top and bottom end caps, respectively; and
    a spring supported by the closed end, acting upon the second bottom end cap and urging all of the end caps and the filtering medias toward the mounting end.

16. The filter of claim 15 wherein the first and second end caps engage opposing ends of the venturi conduit.

17. The filter of claim 15 wherein the first end cap defines throughport means for fluidically communicating fluid from the first collection chamber to the first entrance port.

18. A filter for placement in a housing, comprising:
a first filter element comprising a tubular shaped first filtering media;
a bypass filter element comprising a tubular shaped bypass filtering media, the bypass filtering media disposed radially inside of the first filtering media with the bypass filtering media extending through an area between opposed axial ends of the first filtering media;
a venturi conduit extending at least partially through the bypass filter element, the venturi conduit having a first entrance port and a second entrance port, the second entrance port being proximate a narrowed neck section of the of the venturi conduit for creating a venturi effect for drawing fluid through the bypass filtering media;
a first collection chamber between the bypass filter element and the first filter element; and
a fluid passageway extending around the bypass filter to fluidically connect the first collection chamber with the first entrance port of the venturi conduit.

19. The filter of claim 18 further comprising a second collection chamber between the venturi conduit and the bypass filter element.

20. The filter of claim 18 wherein the first filtering media and the bypass filtering media are generally cylindrical and wherein the first collection chamber is a generally cylindrical chamber, and wherein the bypass filtering media is concentrically inside the first filtering media and the bypass filtering media is completely contained axially inside of opposed axial ends of the first filtering media.

21. The filter of claim 18, further comprising:
first top and bottom end caps engaging opposed ends of the bypass filtering media;
second top and bottom end caps engaging opposed ends of the of the first filtering media, the second top and bottom end caps also engaging the first top and bottom end caps, respectively.

22. The filter of claim 21 wherein the first and second end caps engage opposing ends of the venturi conduit.

23. The filter of claim 22 wherein the first end cap defines throughport means for fluidically communicating fluid from the first collection chamber to the first entrance port.

* * * * *